United States Patent [19]

Nakahata et al.

[11] Patent Number: 5,260,376
[45] Date of Patent: Nov. 9, 1993

[54] RESIN COMPOSITION, CURABLE COMPOSITION AND COATING COMPOSITION

[75] Inventors: Akimasa Nakahata, Hiratsuka; Nobushige Numa; Masahiro Yamane, both of Ebina; Osamu Isozaki, Yokohama; Noboru Nakai, Hiratsuka, all of Japan

[73] Assignee: Kansai Paint Company, Limited, Amagasaki, Japan

[21] Appl. No.: 904,257

[22] Filed: Jun. 25, 1992

Related U.S. Application Data

[62] Division of Ser. No. 486,697, Mar. 1, 1990, Pat. No. 5,166,265.

[30] Foreign Application Priority Data

Mar. 3, 1989 [JP] Japan .................................. 1-52537

[51] Int. Cl.$^5$ ...................... C08L 27/14; C08L 83/00
[52] U.S. Cl. ..................................... 525/101; 525/104; 525/118; 525/121; 525/129; 525/169; 525/200; 525/208; 525/209
[58] Field of Search ............... 525/100, 104, 199, 200, 525/208, 209, 121, 118, 129, 169

[56] References Cited

U.S. PATENT DOCUMENTS

| | | | |
|---|---|---|---|
| 4,354,013 | 10/1982 | Kimura | 528/16 |
| 4,631,326 | 12/1986 | Koishi et al. | 526/249 |
| 4,772,672 | 9/1988 | Isozaki et al. | 526/273 |
| 4,788,266 | 11/1988 | Koishi et al. | 526/249 |
| 4,818,790 | 4/1989 | Ooka et al. | 525/103 |
| 4,876,298 | 10/1989 | Itoh et al. | 523/433 |
| 4,960,827 | 10/1990 | Miyazaki et al. | 525/131 |
| 5,026,793 | 6/1991 | Nakai et al. | 525/476 |

*Primary Examiner*—Ralph H. Dean, Jr.
*Attorney, Agent, or Firm*—Armstrong, Westerman, Hattori, McLeland & Naughton

[57] ABSTRACT

Disclosed are:
1) a three-component resin composition comprising a hydroxyl group-containing compound (A), an epoxy group-containing compound (B) and a silane group-containing compound (C);
2) a two-component resin composition comprising a hydroxyl group-containing compound (A) and silane group- and epoxy group-containing compound (D);
3) a two component resin composition comprising hydroxyl group- and silane group-containing compound (E) and epoxy group-containing compound (B); and
4) two-component resin composition comprising hydroxyl group- and epoxy group-containing compound (F) and silane group-containing compound (C); wherein at least one of the components in each of the resin compositions 1) to 4) is (are) fluorine-containing resin;
5) a curable composition comprising one of the resin compositions 1) to 4) and a metal chelate compound as curing catalyst; and
6) coating compositions comprising such curing composition and when required a pigment.

6 Claims, No Drawings

RESIN COMPOSITION, CURABLE COMPOSITION AND COATING COMPOSITION

This is a division of application Ser. No. 07/486,697 filed Mar. 1, 1990, now U.S. Pat. No. 5,166,265.

The present invention relates to a fluorine-type resin composition, a curable composition and a coating composition.

Conventional methods of curing resins containing hydroxyl group(s) as functional group include those comprising curing such hydroxyl-containing resin with a crosslinking agent such as a diisocyanate compound, melamine resin or the like. These methods, however, has drawbacks. Diisocyanates are toxic and give a coating which is unsatisfactory in weatherability and likely to yellow. Further the resin composition has a short pot life. Use of melamine resins necessitates baking at high temperatures of about 140° C. or above and provides a coating poor in resistance to acids, scratching, staining and weather.

Low-temperature curable nontoxic one-package resin compositions are available. For example, Japanese Unexamined Patent Publication No.67553/1985 discloses a resin composition comprising an aluminum chelate compound and a vinyl polymer comprising as a monomer component alkoxysilane compound such as methacryloxypropyltrimethoxysilane.

Yet these conventional resin compositions are not fully satisfactory. Since the silanol group formed by the hydrolysis of alkoxy group attached to silicon atom is the sole crosslinking functional group, the above composition requires a large quantity of water for curing. Consequently large amounts of by-products, such as alcohol, resulting from the hydrolysis give impaired properties to the cured product. Further when the composition is cured in the presence of only the moisture in air, the composition initially becomes cured at the surface, with its interior generally remaining incompletely cured, so that the curing is likely to result in a shrunk product having a deteriorated fatness.

It is an object of the present invention to provide a resin composition usable in combination with a metal chelate to give a curable composition which has excellent storage stability even in the form of one-package composition and which is useful as, e.g., a coating composition.

It is another object of the invention to provide a curable composition and a coating composition which are excellent in low temperature curability and which give a coating outstanding in properties such as resistance to weather, acids, scratching and staining, mechanical properties and the like.

Other objects and features of the invention will become apparent from the following description.

We conducted extensive research in an attempt to achieve the above objects. Consequently, we have found that a resin composition which comprises a fluorine-type resin and which contains components each having one or two of (i) hydroxyl group, (ii) silanol group and/or hydrolyzable group attached directly to silicon atom and (iii) epoxy group can be used in combination with a metal chelate compound to provide a curable composition that has excellent storage stability despite that said curable composition is in the form of a one-package resin composition. Furthermore, it has also been found that said curable composition is readily curable without causing the foregoing prior art problems and is unlikely to pose toxicity problem. Moreover, the composition can be used as a coating composition that gives a coating excellent in resistance to weather, acids, scratching and staining and the like. The present invention has been accomplished on the basis of these novel findings.

According to the present invention there are provided:

1) a resin composition comprising three components, i.e., a hydroxyl group-containing compound (A), an epoxy group-containing compound (B), and a compound (C) containing hydrolyzable group directly attached to silicon atom and/or silanol group, at least one of compound (A), compound (B) and compound (C) being a fluorine-containing resin (hereinafter referred to as "Invention 1");

2) a resin composition comprising two components, i.e., a hydroxyl group-containing compound (A), and a compound (D) containing hydrolyzable group directly attached to silicon atom and/or silanol group together with epoxy group, at least one of compound (A) and compound (D) being a fluorine-containing resin (hereinafter referred to as "Invention 2");

3) a resin composition comprising two components, i.e., a compound (E) containing hydroxyl group together with hydrolyzable group directly attached to silicon atom and/or silanol group, and an epoxy group-containing compound (B), at least one of compound (E) and compound (B) being a fluorine-containing resin (hereinafter referred to as "Invention 3");

4) a resin composition comprising two component, i.e., a hydroxyl group- and epoxy group-containing compound (F) and a compound (C) containing hydrolyzable group attached directly to silicon atom and/or silanol group, at least one of compound (F) and compound (C) being fluorine-containing resin (hereinafter referred to as "Invention 4");

5) a curable composition comprising one of the resin compositions as defined in the above items 1) to 4) and as a curing catalyst a metal chelate compound; and 6) a coating composition containing as an essential component one of the compositions as defined in the above items 1) to 5).

Throughout the specification, the term "hydrolyzable group" used herein refers to a group which is directly attached to silicon atom and which hydrolyzes in the presence of water or moisture to give silanol group. Examples of such hydrolyzable groups include those represented by the following formulas.

(I)

(II)

(III)

(IV)

(V)

-continued

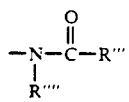 (VI)

In the foregoing formulas, R' is an alkyl having 1 to 4 carbon atoms, R", R''' and R'''' are the same or different and each represent an alkyl group having 1 to 8 carbon atoms, an aryl group or an aralkyl group.

Examples of the $C_{1-8}$ alkyl group in the above formulas are methyl, ethyl, n-propyl, isopropyl, n-butyl, isobutyl, sec-butyl, tert-butyl, n-pentyl, isopentyl, n-octyl, iso-octyl, etc. In the above formulas and throughout the specification, examples of the aryl group are phenyl, tolyl, xylyl, etc. and examples of the aralkyl group are benzyl, phenethyl, etc.

In addition to the above, examples of the hydrolyzable group directly attached to silicon atom may include a group $\equiv$Si—H group.

In this specification, silanol group and the above hydrolyzable group directly attached to silicon atom are referred to as "silane group".

It is suitable that the silane groups in the resin composition of the invention be hydrolyzable groups of the formulas (I) and (II) attached to silicon atom and silanol group in view of high storage stability, curability and the like.

INVENTION 1

A. Hydroxyl Group-Containing Compound (A)

With respect to Invention 1, hydroxyl group-containing compound (A) may be a compound which has at least 2 hydroxyl groups on the average per molecule and which preferably has a number average molecular weight of about 1,000 to 200,000, more preferably about 3,000 to 80,000. If the number of hydroxyl groups is less than 2 on the average per molecule, curability (gel fraction ratio) of the resulting resin composition tends to become insufficient, and hence undesirable. From the view point of weather resistance, water resistance or the like, it is preferable that the number of hydroxyl groups is 400 or less on the average per molecule. If the number average molecular weight of compound (A) is less than 1,000, the properties of the resulting coating such as impact resistance and weather resistance becomes impaired whereas with the molecular weight of more than 200,000, compound (A) tends to have lower compatibility with other components and cause insufficient curing, thereby giving insufficient weather resistance to the resulting coating.

Hydroxyl group-containing compound (A) includes hydroxyl-containing compound (A-1) which is free of fluorine and hydroxyl-containing compound (A-2) which contains fluorine, and each is described below.

(i) Fluorine-Free Hydroxyl Group-Containing Compound (A-1)

Examples of fluorine-free hydroxyl group-containing compound (A-1) are those listed in the following items 1 to 6).

1) Hydroxyl-Containing Vinyl Resin

Typical examples of such resin include a polymer comprising as monomer component a hydroxyl-containing polymerizable unsaturated monomer (a), and when required another polymerizable unsaturated monomer (b).

Hydroxyl-Containing Polymerizable Unsaturated Monomer (a)

Typical of such monomer are the compounds represented by the formulas (1) to (4):

 (1)

wherein $R^1$ is a hydrogen atom or a hydroxyalkyl group;

 (2)

wherein $R^1$ is as defined above;

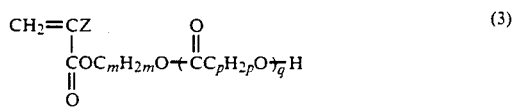 (3)

wherein Z is a hydrogen atom or a methyl group, m is an integer of 2 to 8, p is an integer of 2 to 18, and q is an integer of 0 to 7;

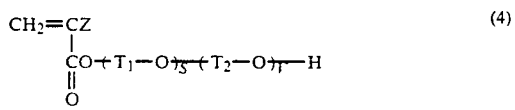 (4)

wherein Z is as defined above, $T_1$ and $T_2$ are the same or different and each represent a $C_{1-20}$ bivalent hydrocarbon group, and s and v are each an integer of 0 to 10 with the proviso that the sum of s and v is 1 to 10.

The hydroxyalkyl group in the formulas (1) and (2) has 1 to 6 carbon atoms. Specific examples thereof are —$C_2H_4OH$, —$C_3H_6OH$, —$C_4H_8OH$, etc.

Examples of the $C_{1-20}$ bivalent hydrocarbon group in the formula (4) are given below.

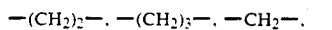

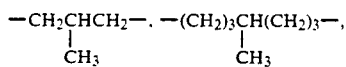

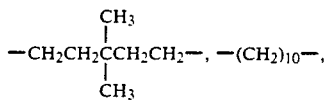

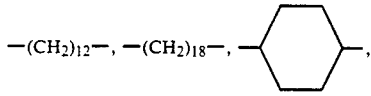

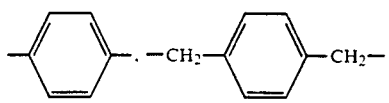

Examples of the monomer component of the formula (1) are $CH_2$=$CHOH$, $CH_2$=$CHOC_4H_8OH$, etc.

Examples of the monomer component of the formula (2) include those represented by the following formulas.

$$CH_2=CHCH_2OH$$

$$CH_2=CHCH_2OCH_2CH_2OH$$

$$CH_2=CHCH_2O\text{-}(CH_2CH_2O)_{\overline{2\text{-}7}}H$$

$$CH_2=CHCH_2O\text{-}(CH_2CH_2O)_{\overline{2\text{-}3}}H$$

Examples of the monomer component of the formula (3) include those represented by the following formulas.

$$CH_2=C(CH_3)COOC_2H_4OH$$

$$CH_2=CHCOOC_3H_6OH$$

$$CH_2=C(CH_3)COOC_3H_6\text{-}O\text{-}\underset{\underset{O}{\|}}{C}\text{-}CH_2CH_2\text{-}$$
$$\text{-}CH_2CH_2CH_2O_{\overline{1\text{-}7}}H$$

Examples of the monomer component of the formula (4) include those represented by the following formulas.

$$CH_2=C(CH_3)COO\text{-}(CH_2CHCH_3O)_{\overline{5\text{-}6}}H$$

$$CH_2=CHCOO\text{-}(CH_2CH_2O)_{\overline{4\text{-}5}}H$$

$$CH_2=C(CH_3)COO\text{-}(CH_2CH_2O)_{\overline{4\text{-}5}}H$$

$$CH_2=CHCOO\text{-}(CH_2CH_2CH_2CH_2O)_{\overline{4\text{-}5}}H$$

$$CH_2=C(CH_3)COO\text{-}(CH_2CH_2O)_{\overline{5\text{-}6}}$$
$$\text{-}(CH_2CHCH_3O)_{\overline{5\text{-}6}}H$$

Also usable as the monomer (a) is an adduct of any of hydroxyl-containing unsaturated monomers of the formulas (1) to (4) with ε-caprolactone, γ-valerolactone or like lactone.

Another Polymerizable Unsaturated Monomer (b)

Typical of such monomer are those shown below as (b-1) to (b-6).

(b-1) Olefin-type compounds such as ethylene, propylene, butylene, isoprene, chloroprene, etc.;

(b-2) Vinyl ethers and allyl ethers such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether, 4-methyl-1-pentyl vinyl ether and like chain-like alkyl vinyl ethers, cyclopentyl vinyl ether, cyclohexyl vinyl ether and like cycloalkyl vinyl ethers, phenyl vinyl ether, o-, m- or p-tolyl vinyl ether and like aryl vinyl ethers, benzyl vinyl ether, phenethyl vinyl ether and like aralkyl vinyl ethers, etc.;

(b-3) Vinyl esters and propenyl esters such as vinyl acetate, vinyl lactate, vinyl butyrate, vinyl isobutyrate, vinyl caproate, vinyl isocaproate, vinyl pivalate, vinyl caprate and like vinyl esters, isopropenyl acetate, isopropenyl propionate and like propenyl esters, etc.;

(b-4) Esters of acrylic or methacrylic acids such as $C_1$–$C_{18}$ alkyl esters of acrylic or methacrylic acids including methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate, $C_2$–$C_{18}$ alkoxyalkyl esters of acrylic or methacrylic acids including methoxybutyl acrylate, methoxybutyl methacrylate, methoxyethyl acrylate, methoxyethyl methacrylate, ethoxybutyl acrylate and ethoxybutyl methacrylate, etc.;

(b-5) Vinyl aromatic compounds such as styrene, α-methyl styrene, vinyltoluene, p-chlorostyrene, etc., and (b-6) Acrylonitrile, methacrylonitrile, etc.

2) Hydroxyl-Containing Polyester Resin

The resin is prepared by esterification or ester interchange reaction of a polybasic acid with a polyhydric alcohol. Examples of useful polybasic acids include the compounds having 2 to 4 carboxyl groups or methyl carboxylate groups per molecule such as phthalic acid or anhydride, isophthalic acid, terephthalic acid, maleic acid or anhydride, pyromellitic acid or anhydride, trimellitic acid or anhydride, succinic acid or anhydride, sebacic acid, azelaic acid, dodecanedicarboxylic acid, dimethyl isophthalate, dimethyl terephthalate and the like. Examples of useful polyhydric alcohols are alcohols having 2 to 6 hydroxyl groups per molecule such as ethylene glycol, polyethylene glycol, propylene glycol, neopentyl glycol, 1,6-hexanediol, trimethylolpropane, pentaerythritol, glycerin, tricyclodecanedimethanol, etc. When required, monobasic acids are usable for preparation of the resin and such monobasic acids include fatty acids of castor oil, soybean oil, tall oil, linseed oil or the like, and benzoic acid.

3) Hydroxyl-Containing Polyurethane Resin

Isocyanato-free resins prepared by modifying a hydroxyl-containing vinyl resin of the above item 1), hydroxyl-containing polyester resin of the above item 2) or the like with a polyisocyanate compound such as tolylene diisocyanate, xylylene diisocyanate, hexamethylene diisocyanate, isophorone diisocyanate or the like.

4) Hydroxyl-Containing Silicone Resin

Alkoxysilane-free and silanol-free resins prepared by modifying a hydroxyl-containing vinyl resin of the above item 1), hydroxyl-containing polyester resin of the item 2) or the like with a silicone resin such as Z-6018 or Z-6188 (trademarks for products of Dow-Corning Corp.), or SH 5050, SH 6018 or SH 6188 (trademarks for products of Toray Silicone Co., Ltd.).

(ii) Fluorine-Containing Hydroxyl Group-Containing Compound (A-2)

Examples of hydroxyl group-containing compound (A-2) which contains fluorine are those listed in the following items 1) to 5).

1) Hydroxyl- and Fluorine-Containing Resin

Typical examples of such resin include a polymer comprising as monomer components a hydroxyl-containing polymerizable unsaturated monomer (a), a fluorine-containing polymerizable unsaturated monomer (c) and when required another polymerizable unsaturated monomer (b).

Fluorine-Containing Polymerizable Unsaturated Monomer (c)

Typical of the monomer (c) are the compounds of the formulas (5) and (6)

$$CX_2=CX_2 \quad (5)$$

wherein the groups X are the same or different and each represent a hydrogen atom, a chlorine atom, a bromine atom, a fluorine atom, an alkyl group or a haloalkyl group, provided that the compound contains at least one fluorine atom;

$$\begin{array}{c} CH_2=CZ \\ | \\ C=O \\ | \\ O-C_nH_{2n}-R^2 \end{array} \quad (6)$$

wherein Z is as defined above, $R^2$ is a fluoroalkyl group and n is an integer of 1 to 10.

The alkyl group in the formula (5) has 1 to 6 carbon atoms, preferably 1 to 4 carbon atoms. Specific examples are methyl, ethyl, propyl, isopropyl, butyl, pentyl, etc. The haloalkyl group in the formula (5) has 1 to 6 carbon atoms, preferably 1 to 4 carbon atoms. Specific examples are $CF_3$, $CHF_2$, $CH_2F$, $CCl_3$, $CHCl_2$, $CH_2Cl$, $CFCl_2$, $(CF_2)_2CF_3$, $(CF_2)_3CF_3$, $CF_2CH_3$, $CF_2CHF_2$, $CF_2Br$, $CH_2Br$, etc.

Examples of the monomer of the formula (5) include the compounds represented by the following formulas.
$CF_2=CF_2$, $CHF=CF_2$, $CH_2=CF_2$,
$CH_2=CHF$, $CClF=CF_2$, $CHCl=CF_2$,
$CCl_2=CF_2$, $CClF=CClF$, $CHF=CCl_2$,
$CH_2=CClF$, $CCl_2=CClF$, $CF_3CF=CF_2$,
$CF_3CF=CHF$, $CF_3CH=CF_2$, $CF_3CF=CH_2$,
$CHF_2CF=CHF$, $CH_3CF=CF_2$, $CH_3CF=CH_2$,
$CF_2ClCF=CF_2$, $CF_3CCl=CF_2$,
$CF_3CF=CFCl$, $CF_2ClCCl=CF_2$,
$CF_2ClCF=CFCl$, $CFCl_2CF=CF_2$,
$CF_2CCl=CClF$, $CF_3CCl=CCl_2$,
$CClF_2CF=CCl_2$, $CCl_3CF=CF_2$,
$CF_2ClCCl=CCl_2$, $CCl_3CF=CF_2$,
$CF_3CF=CHCl$, $CClF_2CF=CHCl$,
$CF_3CCl=CHCl$, $CHF_2CCl=CCl_2$,
$CF_2ClCH=CCl_2$, $CF_2ClCCl=CHCl$,
$CCl_3CF=CHCl$, $CF_2ICF=CF_2$,
$CF_2BrCH=CF_2$, $CF_3CBr=CHBr$,
$CF_2ClCBr=CH_2$, $CH_2BrCF=CCl_2$,
$CF_3CBr=CH_2$, $CF_2CH=CHBr$,
$CF_2BrCH=CHF$, $CF_2BrCF=CF_2$,
$CF_3CF_2CF=CF_2$, $CF_3CF=CFCF_3$,
$CF_3CH=CFCF_3$, $CF_2=CFCF_2CHF_2$,
$CF_3CF_2CF=CH_2$, $CF_3CH=CHCF_3$,
$CF_2=CFCF_2CH_3$, $CF_2=CFCH_2CH_3$,
$CF_3CH_2CH=CH_2$, $CF_3CH=CHCH_3$,
$CF_2=CHCH_2CH_3$, $CH_3CF_2CH=CH_2$,
$CFH_2CH=CHCFH_2$, $CH_3CF_2CH=CH_2$,
$CH_2=CFCH_2CH_3$, $CF_3(CF_2)_2CF=CF_2$,
$CF_3(CF_2)_3CF=CF_2$ The fluoroalkyl group in the formula (6) has 3 to 21 carbon atoms. Specific examples are $C_4F_9$, $(CF_2)_6CF(CF_3)_2$, $C_8F_{17}$, $C_{10}F_{21}$, etc.

Examples of the monomer of the formula (6) include the compounds represented by the following formulas.

$$\begin{array}{c} CH_3 \\ | \\ CH_2=C-COO-C_2H_4-C_4F_9 \end{array}$$

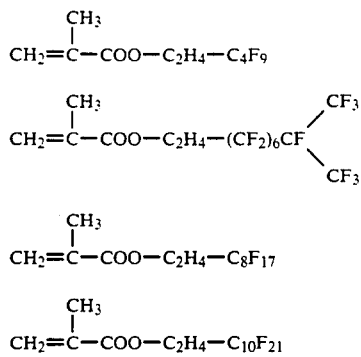

$$\begin{array}{c} CH_3 \\ | \\ CH_2=C-COO-C_2H_4-C_8F_{17} \end{array}$$

$$\begin{array}{c} CH_3 \\ | \\ CH_2=C-COO-C_2H_4-C_{10}F_{21} \end{array}$$

These monomers are usable singly or at least two of them can be used in mixture.

Use of the monomer of the formula (5) gives a coating outstanding in resistance to acids and weather, and use of the monomer of the formula (6) forms a coating excellent in water repellency.

2) Hydroxyl-Containing Silicone Resin Which Further Contains Fluorine

Alkoxy-free and silanol-free resins prepared by modifying the above hydroxyl- and fluorine-containing resin with the silicone resin used in the above item 4).

Hydroxyl-Containing Esterified Fluorine-Containing Resin

This resin is a hydroxyl-containing resin prepared by esterifying the above hydroxyl group-containing resin (A) with a copolymer comprising as monomer component the foregoing fluorine-containing polymerizable unsaturated monomer (c), a carboxyl-containing polymerizable unsaturated monomer (d), and if desired, another polymerizable unsaturated monomer (b).

Carboxyl-Containing Polymerizable Unsaturated Monomer (d)

Typical of monomer (d) are the compounds represented by the formulas (7) and (8):

wherein $R^3$ is a hydrogen atom or a lower alkyl group, $R^4$ is a hydrogen atom, a lower alkyl group or a carboxyl group, and $R^5$ is a hydrogen atom, a lower alkyl group or a carboxy-lower alkyl group;

$$\begin{array}{c} R^6 \ O \\ | \ \| \\ CH_2=C-C-O-C_mH_{2m}-COOH \end{array} \quad (8)$$

wherein $R^6$ is a hydrogen atom or a methyl group, and m is as defined above.

Preferred lower alkyl groups in the formula (7) are those having 1 to 4 carbon atoms, especially methyl.

Examples of the monomer of the formula (7) are acrylic acid, methacrylic acid, crotonic acid, itaconic acid, maleic acid, maleic anhydride, fumaric acid, etc.

Examples of the monomer of the formula (8) are 2-carboxyethyl acrylate or methacrylate, 2-carboxypropyl acrylate or methacrylate, 5-carboxypentyl acrylate or methacrylate, etc.

Also usable as the monomer (d) is an adduct of 1 mole of hydroxyl-containing polymerizable unsaturated monomer (a) with 1 mole of a polycarboxylic acid anhydride compound such as maleic anhydride, itaconic anhydride, succinic anhydride, phthalic anhydride or the like.

4) Hydroxyl-Containing Urethane Fluorine-Containing Resin

Hydroxyl-Containing resin prepared by modifying the foregoing hydroxyl-containing compound (A-1) with the foregoing polyisocyanate compound, and hydroxyl-containing resin prepared by reacting (i) an isocyanato-containing fluorine-containing resin comprising as monomer component a fluorine-containing polymerizable unsaturated monomer (c), an isocyanato-containing polymerizable unsaturated monomer (e), and when required another polymerizable unsaturated monomer (b) with (ii) the foregoing hydroxyl-containing compound (A-1) such that the resulting resin will contain hydroxyl group(s).

Isocyanato-Containing Polymerizable Unsaturated Monomer (e)

Typical examples of the monomer (e) are those represented by the formulas (9) and (10)

 (9)

wherein $R^6$ and n are as defined above, examples of the monomer of the formula (9) being isocyanato-ethyl acrylate or methacrylate; and

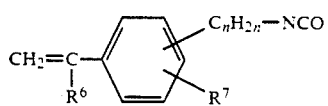 (10)

wherein $R^6$ and n are as defined above and $R^7$ is a hydrogen atom or an alkyl group having 1 to 5 carbon atoms, examples of the monomer of the formula (10) being α,α-dimethyl-m-isopropenyl benzyl isocyanate.

Also usable is a reaction product of 1 mole of the hydroxyl-containing polymerizable unsaturated monomer (a) and 1 mole of a polyisocyanate compound. Examples of such polyisocyanate compounds are tolylene diisocyanate, 1,6-hexamethylene diisocyanate, 4,4′-diphenylmethane diisocyanate, 4,4′-diphenyl ether diisocyanate, phenylene diisocyanate, naphthalene diisocyanate, biphenylene diisocyanate, 3,3′-dimethyl-4,4′-biphenylene diisocyanate, dicyclohexylmethane 4,4′-diisocyanate, p-xylylene diisocyanate, m-xylylene diisocyanate, bis(4-isocyanatophenyl)sulfone, isopropylidenebis(4-phenylisocyanate), lysine isocyanate and isophorone diisocyanate, polymers thereof, biurets thereof, etc.

Also usable as the isocyanato-containing fluorine-containing resin is a reaction product prepared by reacting a hydroxyl-containing resin (A-2) with, e.g., the above polyisocyanate compound.

5) Other Hydroxyl-Containing Fluorine-Containing Resin

Hydroxyl-containing resin prepared by polymerizing an epoxy-containing polymerizable unsaturated monomer (such as glycidyl acrylate or methacrylate), a fluorine-containing polymerizable unsaturated monomer (c) and when required another polymerizable unsaturated monomer (b) in the presence of a copolymer comprising as monomer component a carboxyl-containing polymerizable unsaturated monomer (d), a hydroxyl-containing polymerizable unsaturated monomer (a) and if desired another polymerizable unsaturated monomer (b).

B. Epoxy Group-Containing Compound (B)

Epoxy group-containing compound (B) is a compound which has at least 2, preferably 2 to 300, epoxy groups on the average per molecule and which preferably has a number average molecular weight of about 120 to 200,000, more preferably about 240 to 80,000. If the number of epoxy groups is less than 2 on the average per molecule, curability of the resulting resin composition (gel fraction ratio) tends to become insufficient. It is difficult to obtain such compound having a number average molecular weight of less than 120, and if the number average molecular weight is more than 200,000, compound (B) tends to have lower compatibility with other components, thereby giving insufficient weather resistance to the resulting coating.

(i) Fluorine-Free Epoxy-Containing Compound (B)

Examples of epoxy group-containing compound (B) which is free of fluorine are those represented by the following formulas.

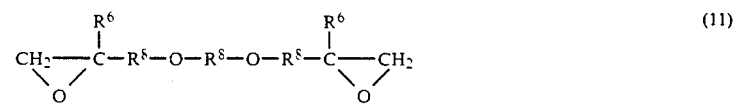 (11)

-continued

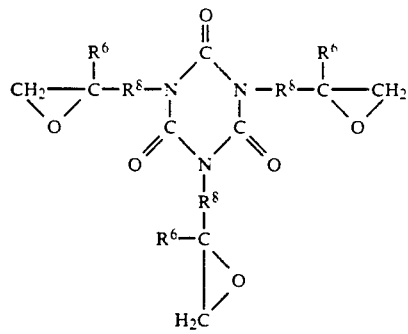
(12)

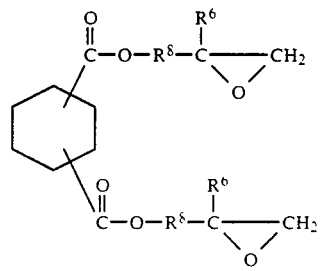
(13)

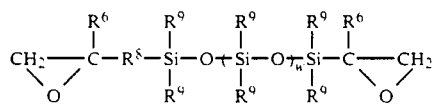
(14)

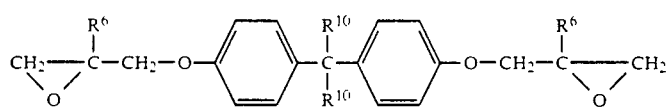
(15)

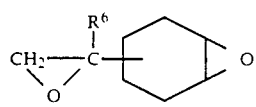
(16)

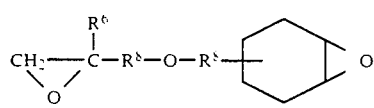
(17)

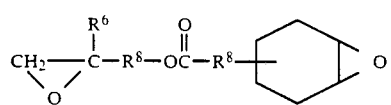
(18)

wherein $R^6$ is as defined above, $R^8$ is a $C_{1-8}$ bivalent hydrocarbon group, and groups $R^6$ and groups $R^8$ may be the same or different, groups $R^9$ are the same or different and each represent an alkyl group having 1 to 8 carbon atoms, an aryl group or an aralkyl group, groups $R^{10}$ are the same or different and each represent a hydrogen atom or an alkyl group having 1 to 4 carbon atoms, and w is 0 or an integer of 1 to 10.

Examples of the above $C_{1-8}$ bivalent hydrocarbon group may be selected from those already exemplified with respect to $C_{1-20}$ bivalent hydrocarbon group.

Examples of the compounds of the formulas (11)–(18) are as follows.

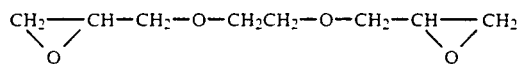

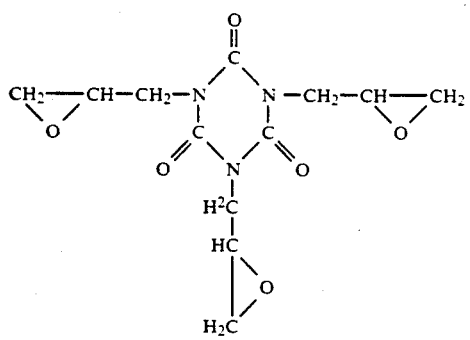
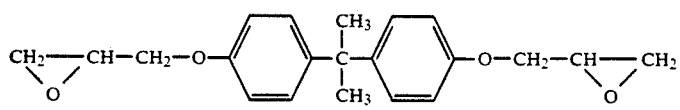
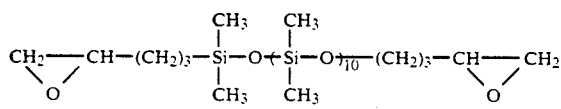
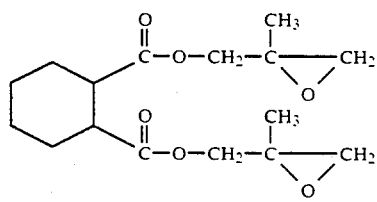
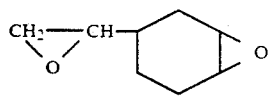
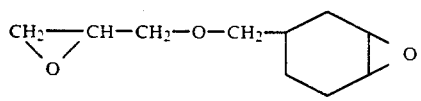
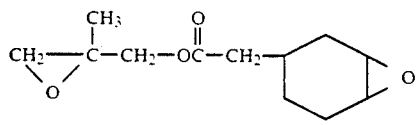
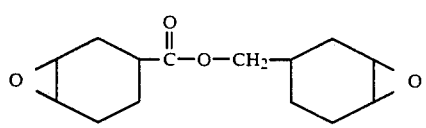
Further examples of fluorine-free epoxy compound include those represented by the formulas.
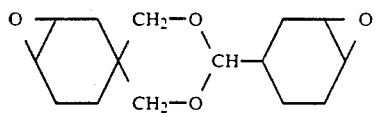
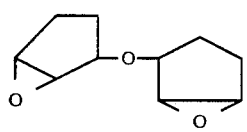
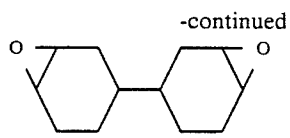
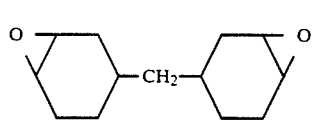
Also usable as the polyepoxy compound is an adduct of
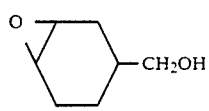

with a polyisocyanate compound. Examples of such polyisocyanate compounds are organic diisocyanates such as hexamethylene diisocyanate, trimethyl hexamethylene diisocyanate and like aliphatic diisocyanates; hydrogenated xylylene diisocyanate, isophorone diisocyanate and like cyclic aliphatic diisocyanates; tolylene diisocyanate, 4,4'-diphenylmethane diisocyanate and like aromatic diisocyanates; an adduct of the organic diisocyanate with a polyhydric alcohol, a low-molecular-weight polyester resin, water or the like; a polymer of such organic diisocyanates, biurets, etc. Representative commerical products of polyisocyanate compounds are those available under the trademarks: "BURNOCK D-750, -800, DN -950, DN-970 and 15-455" (products of Dainippon Ink And Chemicals Incorporated), "DESMODUL L, NHL, IL, N3390" (products of Bayer AG, West Germany), "TAKENATE D-102, -202, -110N and -123N" (products of Takeda Chemical Industries, Ltd.), "COLONATE L, HL, EH and 203" (products of Nippon Polyurethane Kogyo K.K.), "DURANATE 24A-90CX" (product of Asahi Chemical Industry Co., Ltd.), etc. Also usable as the epoxy compound (B) are an adduct of a compound of the formula

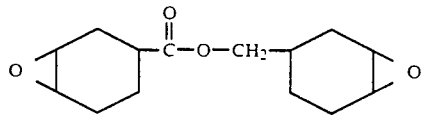

with a polybasic acid; a product prepared by oxidizing an esterification product having unsaturated group such as a group

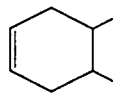

in the molecule with a peracetic acid or the like, examples of the esterification product being an esterification product of 900 in number average molecular weight prepared by esterifying tetrahydrophthalic anhydride, trimethylol-propane, 1,4-butanediol and the like.

Also usable as epoxy group-containing compound (B) is a polymer comprising as monomer component an epoxy-containing polymerizable unsaturated monomer (f) and if desired another polymerizable unsaturated monomer (b).

Epoxy-Containing Polymerizable Unsaturated Monomer (f)

The monomer (f) is a compound containing epoxy group and radically polymerizable unsaturated group in the molecule. Examples of the radically polymerizable unsaturated group include the groups represented by the formulas

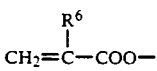

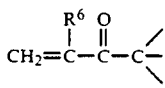

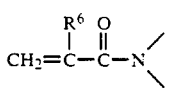

$CH_2=CHO-$ $CH_2=CH-$

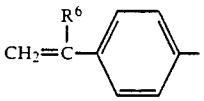

In the foregoing formula, $R^6$ is as defined above.

Examples of the epoxy-containing polymerizable unsaturated monomer (f) having radically polymerizable unsaturated group $CH_2=C(R^6)COO-$ include the compounds represented by the formulas (19) to (31).

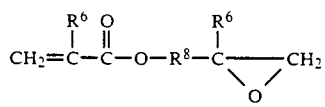 (19)

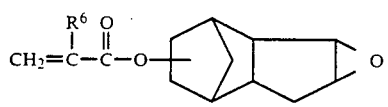 (20)

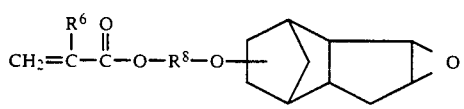 (21)

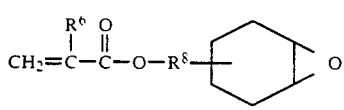 (22)

-continued
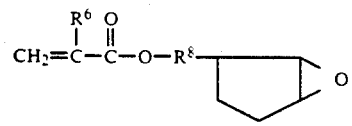 (23)
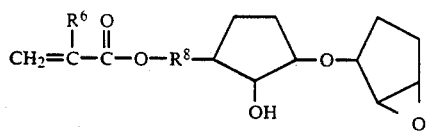 (24)
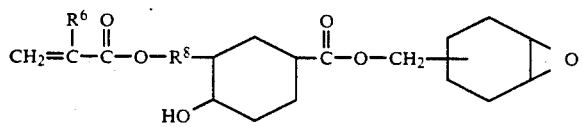 (25)
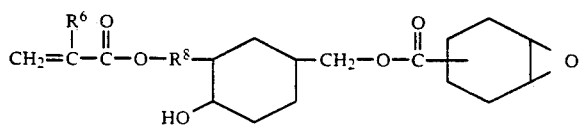 (26)
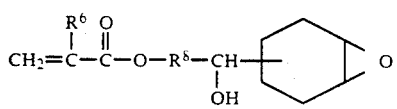 (27)
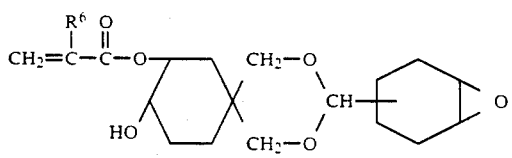 (28)
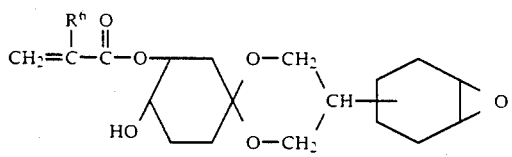 (29)
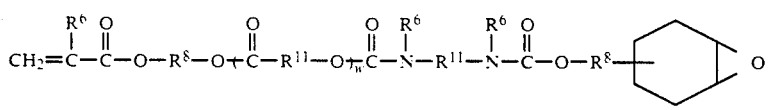 (30)
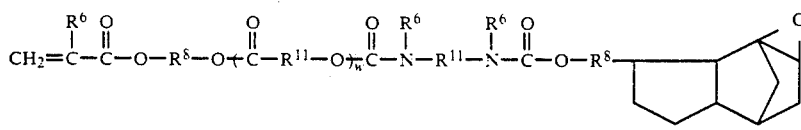 (31)
In the foregoing formulas, $R^6$, $R^8$ and w are as defined above. $R^{11}$ is a $C_{1-20}$ bivalent hydrocarbon group, the groups $R^6$ are the same or different, the groups $R^8$ are the same or different and the groups $R^{11}$ are the same or different.
Specific examples of the monomers of the formulas (19) to (31) are those represented by the following formulas.
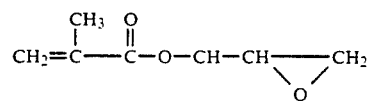
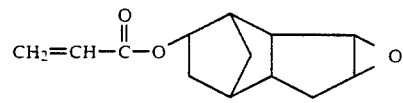

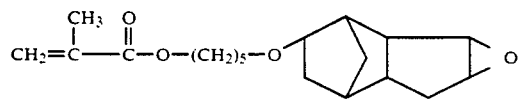

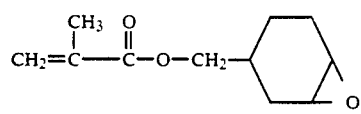

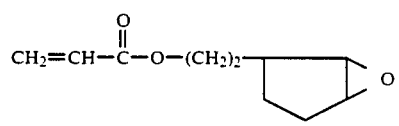

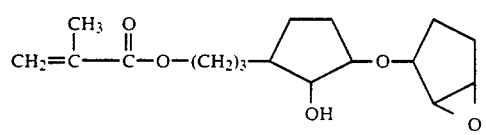

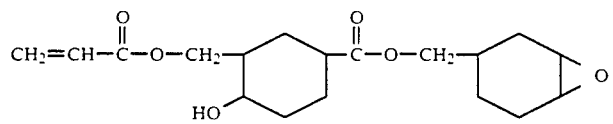

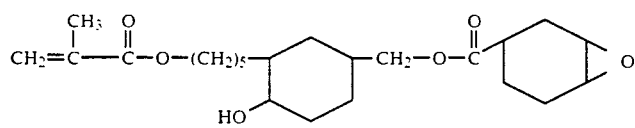

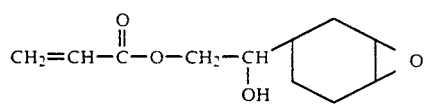

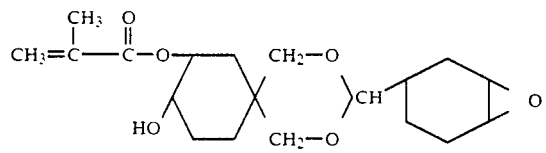

Examples of the epoxy-containing polymerizable unsaturated monomer (f) having radically polymerizable unsaturated group

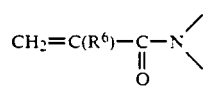

are those represented by the formulas (32) to (34).

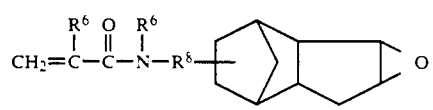
(32)

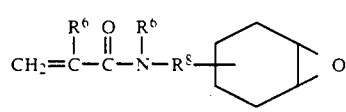
(33)

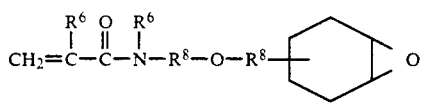
(34)

In the foregoing formulas, $R^6$ and $R^8$ are as defined above, the groups $R^6$ are the same or different, and the groups $R^8$ are the same or different.

Specific examples of the compounds of the formulas (32) to (34) include those represented by the following formulas.

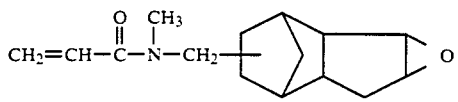

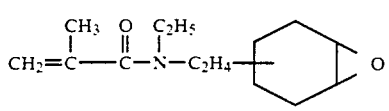

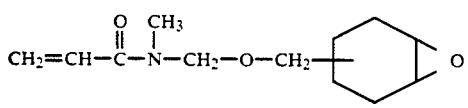

Examples of the epoxy-containing polymerizable unsaturated monomer (f) having radically polymerizable unsaturated group

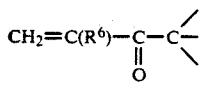

are inclusive of those represented by the formulas (35) to (37).

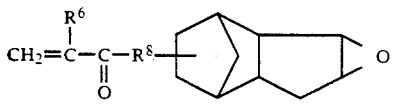

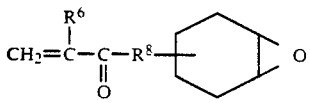

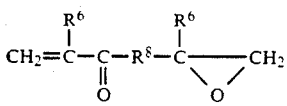

In the foregoing formulas, $R^6$ and $R^8$ are as defined above, the groups $R^6$ are the same or different, and the groups $R^8$ are the same or different.

Specific examples of the compounds of the formulas (35) to (37) are those represented by the following formulas.

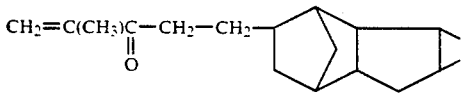

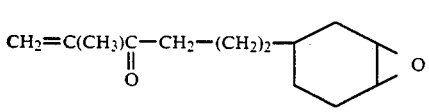

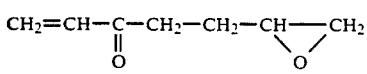

Examples of the epoxy-containing polymerizable unsaturated monomer (f) having radically polymerizable unsaturated group

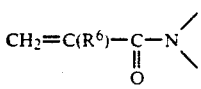

are those exemplified above and represented by the formulas (38) to (43).

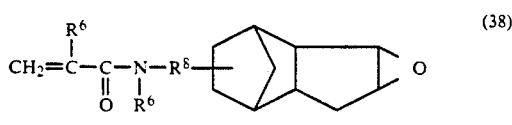

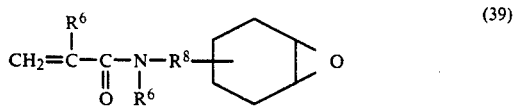

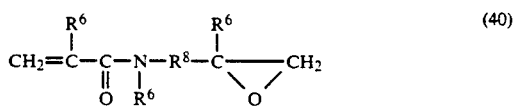

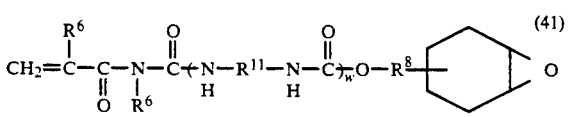

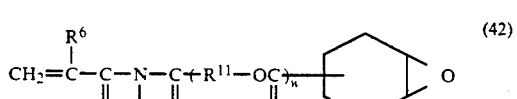

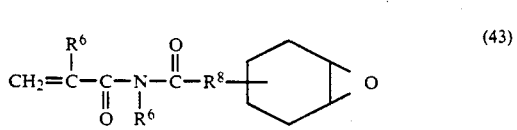

In the foregoing formula, $R^6$, $R^8$, $R^{11}$ and w are as defined above, the groups $R^6$ are the same or different, the groups $R^8$ are the same or different and the groups $R^{11}$ are the same or different.

Specific examples of the compounds of the formulas (38) to (43) are those represented by the following formulas.

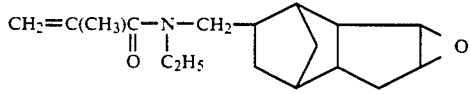

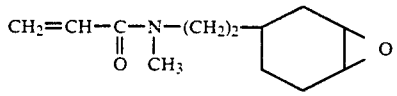

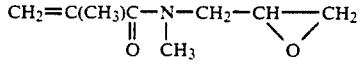

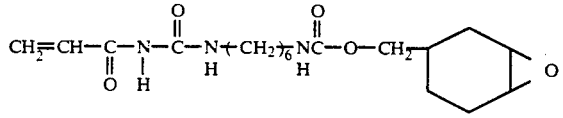

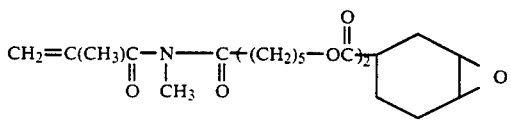

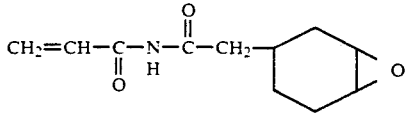

Examples of the epoxy-containing polymerizable unsaturated monomer (f) having radically polymerizable unsaturated group CH$_2$=CHCH$_2$O— are those represented by the formulas (44) to (47).

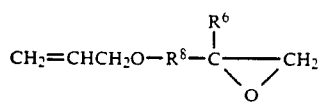 (44)

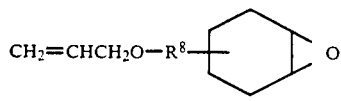 (45)

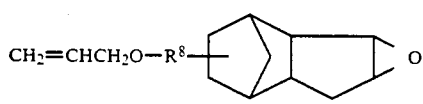 (46)

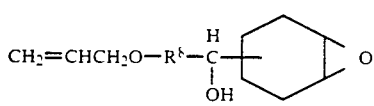 (47)

In the foregoing formulas, R$^6$ and R$^8$ are as defined above the groups R$^8$ are the same or different.

Specific examples of the compounds of the formulas (44) to (47) include those represented by the following formulas.

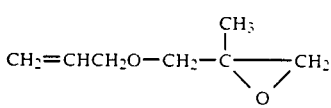

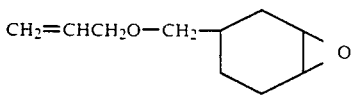

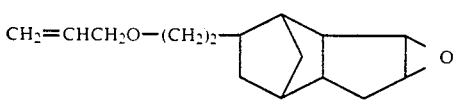

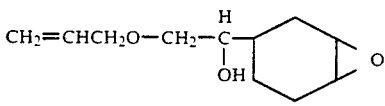

Examples of the epoxy-containing polymerizable unsaturated monomer (f) having radically polymerizable unsaturated group CH$_2$=CH— are inclusive of those represented by the formulas (48) to (50).

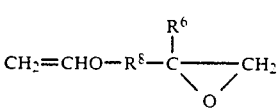 (48)

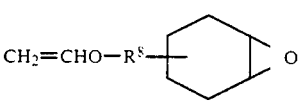 (49)

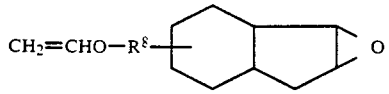 (50)

In the foregoing formulas, R$^6$ and R$^8$ are as defined above and the groups R$^8$ are the same or different.

Specific examples of the compounds of the formulas (48) to (50) are those represented by the following formulas.

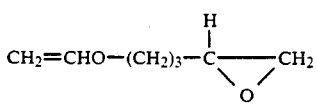

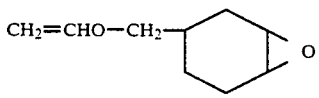

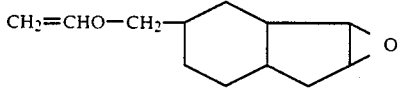

Examples of the epoxy-containing polymerizable unsaturated monomer (f) having radically polymerizable unsaturated group CH$_2$=CH— include the compounds represented by the formulas (51) to (53).

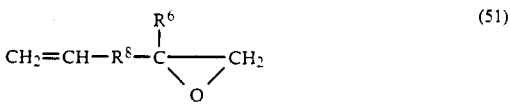 (51)

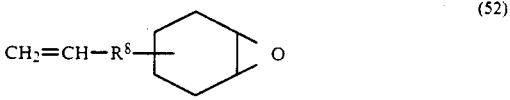 (52)

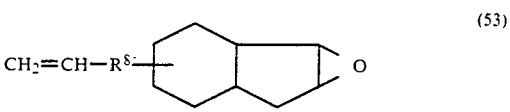 (53)

In the foregoing formulas, R$^6$ and R$^8$ are as defined above and the groups R$^8$ are the same or different.

Specific examples of the compounds of the formulas (51) to (53) include those represented by the following formulas.

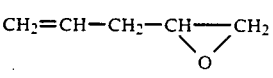

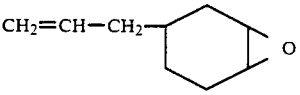

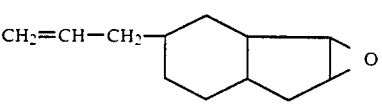

Examples of the epoxy-containing polymerizable unsaturated monomer (f) having radically polymerizable unsaturated group

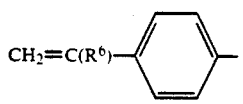

include the compounds represented by the formulas (54) to (58).

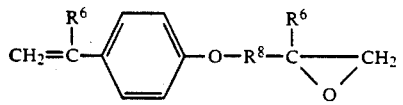 (54)

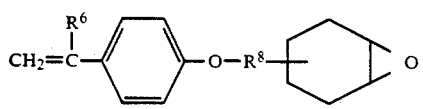 (55)

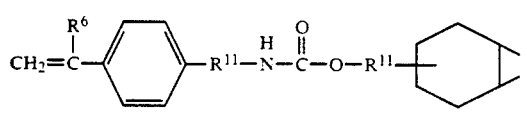 (56)

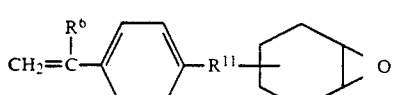 (57)

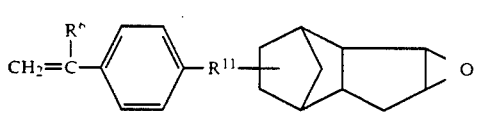 (58)

In the foregoing formulas, $R^6$, $R^8$ and $R^{11}$ are as defined above, the groups $R^6$ are the same or different and the groups $R^{11}$ are the same or different.

Specific examples of the compounds of the formulas (54) to (58) include those represented by the following formulas.

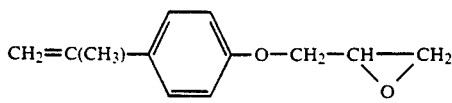

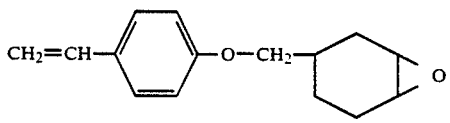

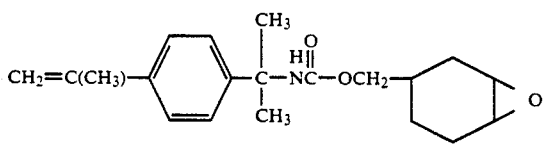

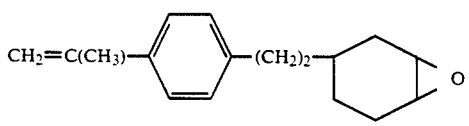

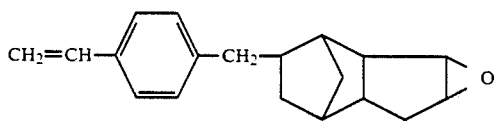

Also usable as epoxy group-containing compound (B) is a reaction product prepared by reacting the foregoing hydroxyl-containing compound (A-1) with a compound containing one isocyano group and one epoxy group in the molecule such that at least 1 mole of the latter compound is used per hydroxyl group of the hydroxyl-containing compound (A-1) so as to consume all of the hydroxy groups of the hydroxyl-containing compound (A-1). Examples of said compound containing one isocyanato group and one epoxy group in the molecule are those represented by the following formulas.

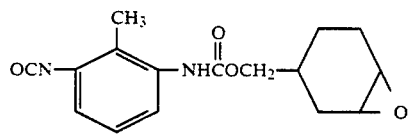

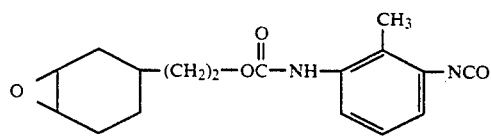

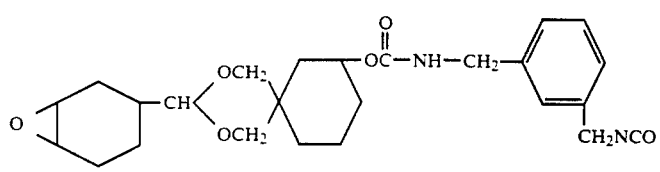

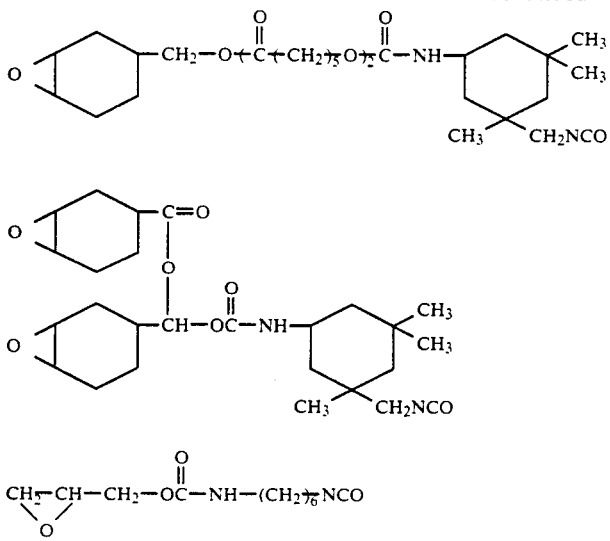

(ii) Fluorine-Containing Epoxy-Containing Compound (B)

Examples of epoxy-containing compound (B) which contains fluorine are a copolymer prepared by copolymerizing fluorine-containing polymerizable unsaturated monomer (c), epoxy-containing polymerizable unsaturated monomer (f) and, if desired, another polymerizable unsaturated monomer (b); and a resin prepared by reacting the foregoing fluorine-containing hydroxyl-containing compound (A-2) with the above compound which contains one isocyanato group and one epoxy group in the molecule.

C. Silane Compound (C)

Silane compound (C) is a compound which contains at least 1 silane group on the average per molecule. If the number of silane groups is less than 1 on the average per molecule, the resulting composition will have inferior curability (gel fraction ratio). As the number of silane groups increases, the reaction between silane groups and epoxy groups preferentially takes place, reducing the number of epoxy groups which are needed to react with hydroxyl groups, and consequently impairing the curability of the resulting coating (gel fraction ratio). Thus the number of silane groups is preferably 2,500 or less on the average per molecule. Furthermore, silane compound (C) has a number average molecular weight of 104 to 200,000. It is difficult to obtain such compound having a number average molecular weight of less than 104, and if the number average molecular weight is more than 200,000, silane compound (C) tends to have lower compatibility with other components, thereby giving insufficient weather resistance to the resulting coating.

(i) Fluorine-Free Silane Group-Containing Compound (C)

Examples of fluorine-free silane group-containing compounds (C) are those of the following items.

1) Polysilane Compound

Examples of polysilane compound are those represented by the formulas (59) to (61).

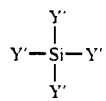 (59)

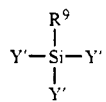 (60)

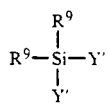 (61)

In the foregoing formulas, the groups Y' are the same or different and each represent a hydrogen atom, a hydroxyl group or a hydrolyzable group exemplified above, $R^9$ is as defined above and the groups $R^9$ are the same or different.

Specific examples of the compounds having the formulas (59) to (61) are dimethyldimethoxysilane, dibutyldimethoxysilane, diisopropyldipropoxy silane, diphenyldibutoxysilane, diphenyldiethoxysilane, diethyldisilanol, dihexyldisilanolmethyltrimethoxysilane, methyltriethoxysilane, ethyltriethoxysilane, propyltrimethoxysilane, phenyltriethoxysilane, phenyltributoxysilane, hexyltriacetoxysilane, methyltrisilanol, phenyltrisilanol, tetramethoxysilane, tetraethoxysilane, tetrapropoxysilane, tetraacetoxysilane, di-iso-propoxydivalerooxysilane, tetrasilanol, and the compounds represented by the formulas

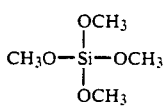

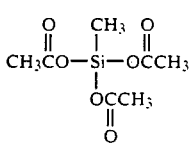

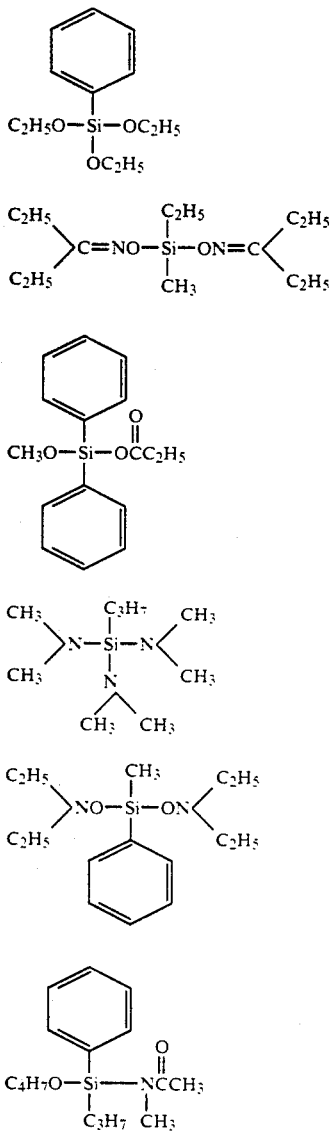

Condensation products of such polysilane compounds are also usable.

The above silane compounds preferably have a number average molecular weight of 104 to 40,000, more preferably 104 to 30,000. Silane compounds having a number average molecular weight of less than 104 are not readily available, whereas those having a number average molecular weight of more than 40,000 tends to have lower compatibility with other components, thereby giving impaired weather resistance to the resulting coating.

2) A homopolymer of silane group-containing polymerizable unsaturated monomer (g) or a copolymer of such monomer (g) and another polymerizable unsaturated monomer (b).

Silane-Containing Polymerizable Unsaturated Monomer (g)

Monomer (g) is a compound containing at least one silane group and radically polymerizable unsaturated group in the molecule. Examples of the radically polymerizable unsaturated group are those represented by the formulas

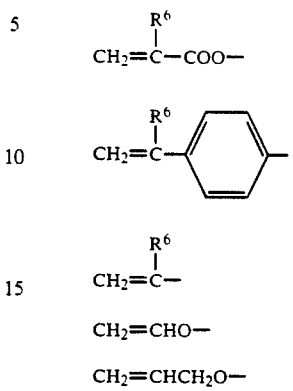

$CH_2=CHO—$ $CH_2=CHCH_2O—$ wherein $R^6$ is as defined above.

Examples of the silane group-containing polymerizable unsaturated monomer (g) having radically polymerizable unsaturated group $CH_2=C(R^6)—COO—$ include the compounds represented by the formula (62)

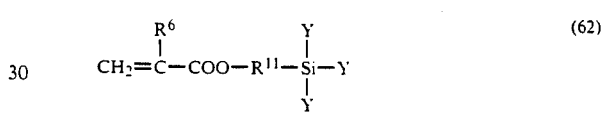

wherein $R^6$ and $R^{11}$ are as defined above, groups Y are the same or different and each represent a hydrogen atom, a hydroxyl group, a hydrolyzable group, a $C_{1-8}$alkyl group, an aryl group or an aralkyl group, and at least one of groups Y is a hydrogen atom, a hydroxyl group or a hydrolyzable group.

Examples of the compounds of the formula (62) are
γ-(meth)acryloxypropyltrimethoxysilane,
γ-(meth)acryloxypropyltriethoxysilane,
γ-(meth)acryloxypropyltripropoxysilane,
γ-(meth)acryloxypropylmethyldimethoxysilane,
γ-(meth)acryloxypropylmethyldiethoxysilane,
γ-(meth)acryloxypropylmethyldipropoxysilane,
γ-(meth)aoryloxybutylphenyldimethoxysilane,
γ-(meth)acryloxybutylphenyldiethoxysilane,
γ-(meth)acryloxybutylphenyldipropoxysilane,
γ-(meth)acryloxypropyldimethylmethoxysilane,
γ-(meth)acryloxypropyldimethylethoxysilane,
γ-(meth)acryloxypropylphenylmethylmethoxysilane,
γ-(meth)acryloxypropylphenylmethylethoxysilane,
γ-(meth)acryloxypropyltrisilanol,
γ-(meth)acryloxypropylmethyldihydroxysilane,
γ-(meth)acryloxybutylphenyldihydroxysilane,
γ-(meth)acryloxypropyldimethylhydroxysilane,
γ-(meth)acryloxypropylphenylmethylhydroxysilane,
and compounds represented by the following formulas.

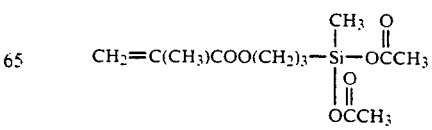

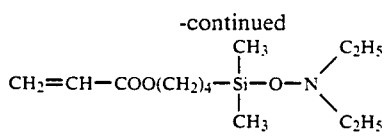

Examples of silane group-containing polymerizable unsaturated monomer (g) having radically polymerizable unsaturated group

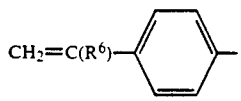

include the compounds represented by the formulas (63) to (65)

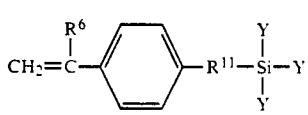 (63)

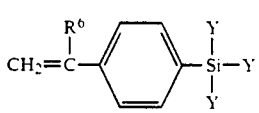 (64)

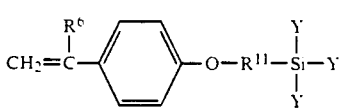 (65)

In the foregoing formulas, $R^6$, $R^{11}$ and Y are as defined above, the groups Y are the same or different, and at least one of the groups Y is a hydrogen atom, a hydroxyl group or a hydrolyzable group.

Specific examples of the compounds of the formulas (63) to (65) include the compounds represented by the following formulas.

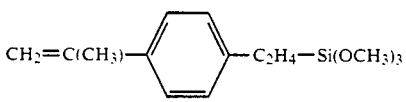

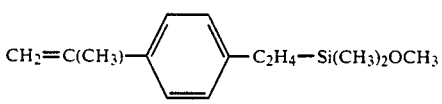

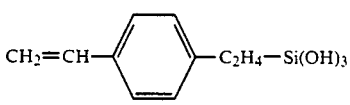

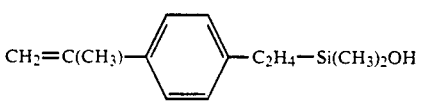

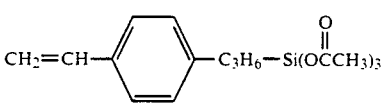

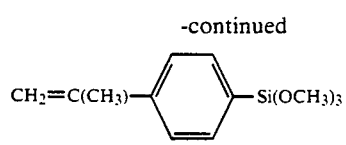

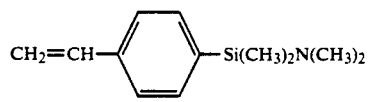

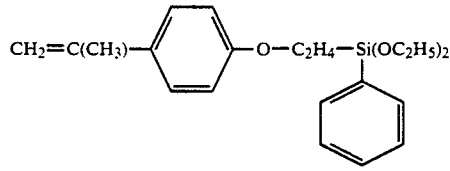

Examples of silane-containing polymerizable unsaturated monomer (g) having radically polymerizable unsaturated group of the formula $CH_2=C(R^6)-$ include the compounds of the formulas (66) to (67).

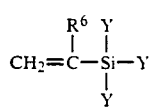 (66)

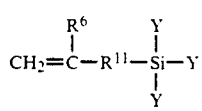 (67)

In the formulas (66) and (67), $R^6$, $R^{11}$ and Y are as defined above, the groups Y may be the same or different and at least one of Y is a hydrogen atom, a hydroxyl group or a hydrolyzable group.

Specific examples of the compounds of the formulas (66) and (67) are those represented by the following formulas.

$CH_2=CH-Si(OCH_3)_3$ $CH_2=CH-Si(OC_2H_5)_3$ $CH_2=CH-Si(OCH_3)_2CH_3$ $CH_2=CH-Si(CH_3)_2OCH_3$ $CH_2=CH-CH_2Si(OCH_3)_3$ $CH_2=CH-Si(OCOCH_3)_3$ $CH_2=CH-CH_2Si(OCOCH_3)_3$ $CH_2=CH-Si(CH_3)_2N(CH_3)_2$

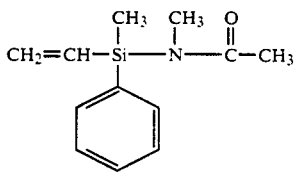

-continued

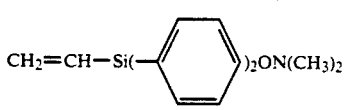

Examples of silane-containing polymerizable unsaturated monomer (g) having radically polymerizable unsaturated group of the formula CH$_2$=CHO— include the compounds represented by the formulas (68) and (69).

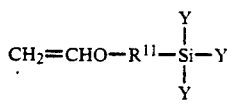
(68)

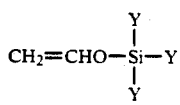
(69)

In the foregoing formulas, R$^{11}$ and Y are as defined above, the groups Y may be the same or different and at least one of the groups Y is a hydrogen atom, a hydroxyl group or a hydrolyzable group.

Specific examples of the compounds represented by the formulas (68) and (69) are following compounds.

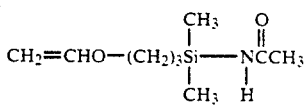

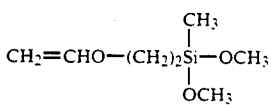

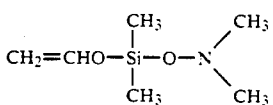

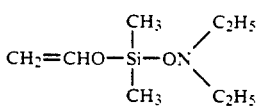

Examples of silane-containing polymerizable unsaturated monomer (g) having radically polymerizable unsaturated group of the formula CH$_2$=CHCH$_2$O— include the compounds of the following formulas (70) and (71).

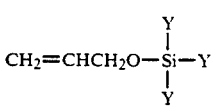
(70)

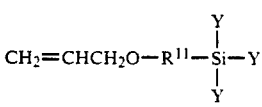
(71)

In the foregoing formulas (70) and (71), R$^{11}$ and Y are as defined above, the groups Y may be the same or different and at least one of the groups Y is a hydrogen atom, a hydroxyl group or a hydrolyzable group.

Specific examples of the compounds of the formulas (70) and (71) include those represented by the following formulas.

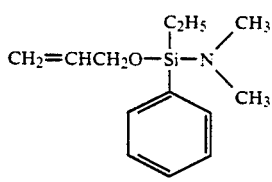

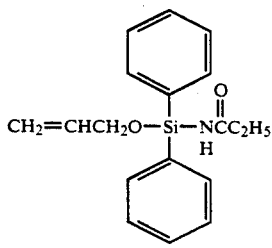

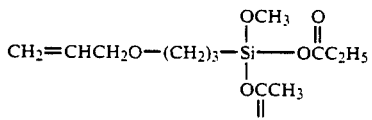

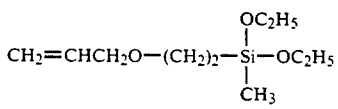

In addition to the silane group-containing polymerizable unsaturated monomer (g), a polysiloxane unsaturated monomer containing silane group and polymerizable unsaturated group and prepared by reacting the silane group-containing polymerizable unsaturated monomer (g) with, for example, a polysilane compound (e.g. compounds represented by the formulas (59) to (61)).

Representative of the polysiloxane unsaturated monomer is a polysiloxane macromonomer produced by reacting about 30 to about 0.001 mole % of a compound of the formula (62) and about 70 to about 99.999 mole % of at least one of the compounds of the formulas (59) to (61) (for example those disclosed in Japanese Unexamined Patent Publication No. 275132/1987). Also useful as the polysiloxane unsaturated monomer are the compounds represented by the following formulas.

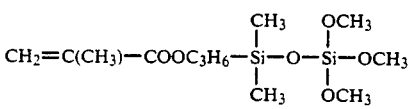

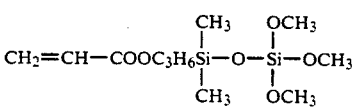

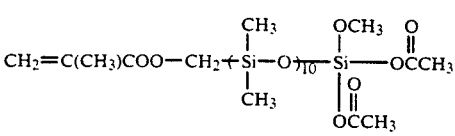

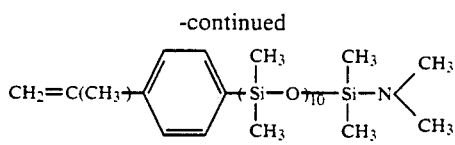

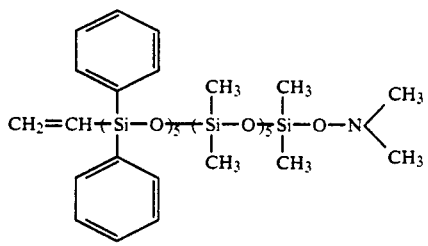

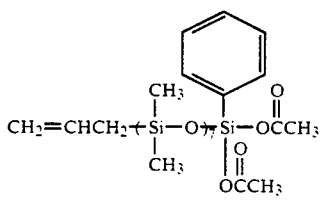

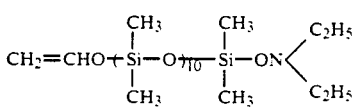

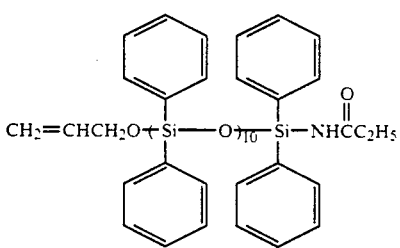

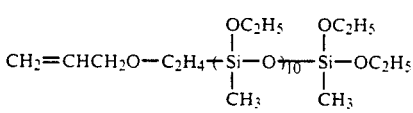

3) A reaction product prepared by reacting the foregoing hydroxyl-containing compound (A-1) with a compound containing isocyanato group and silane group in the molecule such that the resulting reaction product will have no isocyanato group.

Examples of the compound-containing isocyanato group and silane group (i.e., isocyanato-containing silane compound) are represented by the formulas (72) and (73).

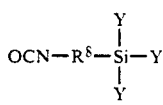  (72)

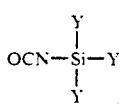  (73)

In the foregoing formulas, $R^6$ and Y are as defined above and the groups Y may be the same or different, and at least one of the groups Y is a hydrogen atom, a hydroxyl group or a hydrolyzable group.

Examples of the compounds of the formula (72) and (73) are those represented by the following formulas.

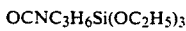

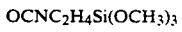

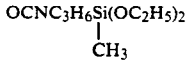

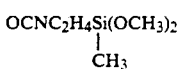

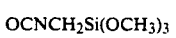

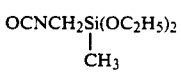

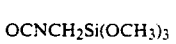

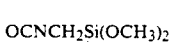

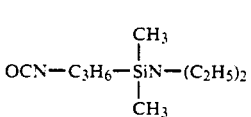

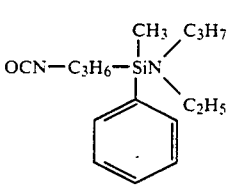

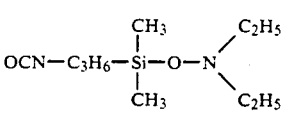

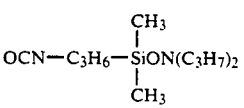

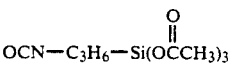

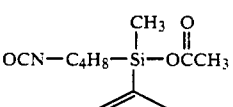

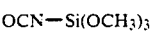

-continued

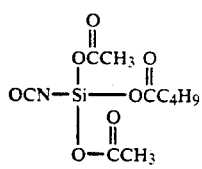

Also usable as the isocyanato-containing silane compound is a compound prepared by reacting a hydroxyl-containing silane compound to be described later with the foregoing polyisocyanate compound.

Examples of such isocyanato-containing silane compound include a reaction product of such a hydroxyl-containing silane compound and hexamethylene diisocyanate or tolylene diisocyanate, such as products represented by the following formulas.

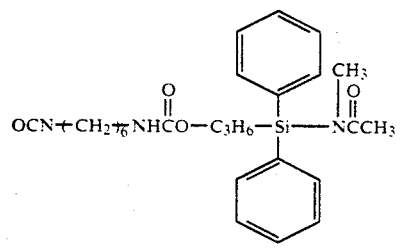

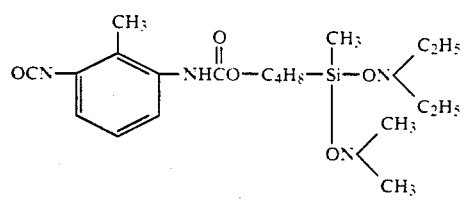

Useful isocyanato-containing silane compounds further include a condensation product of the above isocyanato-containing silane compound with, e.g. the foregoing polysilane compound, such as one represented by the following formula.

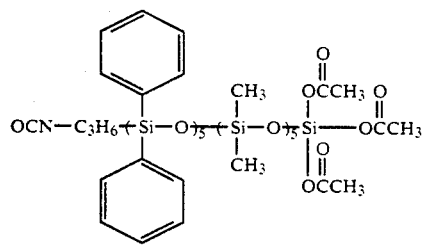

(ii) Fluorine-Containing Silane Compound (C)

Examples of silane group-containing compound (C) that contains fluorine are those described below.

1) A reaction product of the foregoing hydroxyl-containing compound (A-2) with the above polysilane compound.

2) A reaction product of the foregoing hydroxyl-containing compound (A-2) with the above isocyanato-containing silane compound.

3) A reaction product of a hydroxyl-containing silane compound with a copolymer comprising as monomer components a fluorine-containing polymerizable unsaturated monomer (c), an isocyanato group-containing polymerizable unsaturated monomer (e) and if desired another polymerizable unsaturated monomer (b).

Examples of such hydroxyl-containing silane compound are those represented by the formulas (74) to (76).

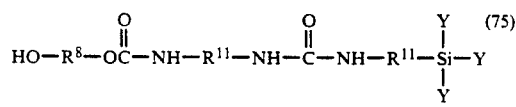

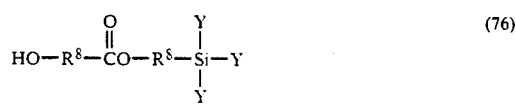

In the formulas, $R^8$, $R^{11}$ and Y are as defined above; the groups $R^8$ are the same or different, the groups $R^{11}$ are the same or different, and the groups Y are the same or different, provided that at least one of the groups Y is a hydrogen atom, a hydroxyl group or a hydrolyzable group.

Specific examples of the compounds of the formulas (74) to (76) are those represented by the following formulas.

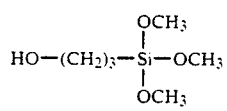

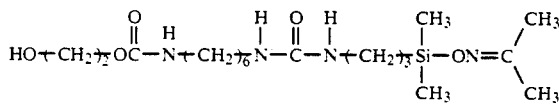

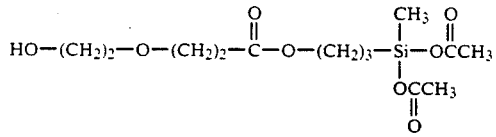

4) A copolymer comprising as monomer components the foregoing fluorine-containing polymerizable unsaturated monomer (c), silane group-containing polymerizable unsaturated monomer (g) and when required another polymerizable unsaturated monomer (b).

5) A reaction product prepared by reacting a mercapto-containing silane compound with a copolymer comprising as monomer components fluorine-containing polymerizable unsaturated monomer (c), epoxy-containing polymerizable unsaturated monomer (f) and if required another polymerizable unsaturated monomer (b) such that the resulting reaction product will have no epoxy group.

Examples of the above mercapto-containing silane compound are those represented by the following formulas.

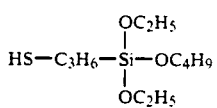

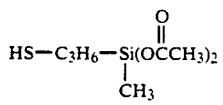

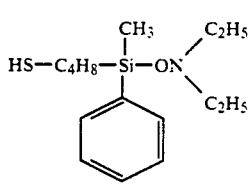

Invention 2

The epoxy- and silane group-containing compound (D) for use in Invention 2 of the present invention has in the molecule at least two, preferably 2 to 300, epoxy groups on the average and at least one silane group on the average. Compounds having epoxy groups or silane groups less than the above range in number are undesirable since lower curability (gel fraction ratio) will then result. On the other hand, with an increase in the number of silane groups as already stated, epoxy groups are consumed, decreasing the amount of epoxy groups needed for the curing reaction with hydroxyl groups and impairing the curability of the resin composition. It is therefore desired that up to 2,500 silane groups be present in the molecule on the average. The compound (D) is preferably 1,000 to 200,000, more preferably 3,000 to 80,000, in number average molecular weight. If the molecular weight is less than 1,000, the resulting coating is inferior in curability, weather resistance, etc., whereas if it is over 200,000, the compound is less compatible with other components and is therefore undesirable.

(i) Fluorine-Free Compound (D)

Examples of fluorine-free compound (D) include the compounds as described in the following items 1) to 3).

1) Copolymers comprising as monomer components thereof silane group-containing polymerizable unsaturated monomer (g), epoxy-containing polymerizable unsaturated monomer (f) and, when required, another polymerizable unsaturated monomer (b).

2) Reaction products of hydroxyl-containing compound (A-1), the aforementioned isocyanato-containing epoxy compound and the aforementioned isocyanato-containing silane compound.

3) Compounds represented by the formula (77) or (78).

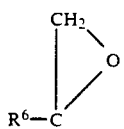

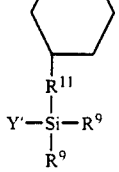

wherein $R^6$, $R^9$, $R^{11}$ and $Y'$ are each as defined above, and the two groups $R^9$ may be the same or different.

Examples of compounds represented by the above formulae are γ-glycidoxypropyltrimethoxysilane, γ-glycidoxypropyltriethoxysilane, γ-glycidoxypropyltriacetoxysilane, glycidoxyethyltrimethoxysilane, β-glycidoxyethyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltriacetoxysilane, γ-(3,4-epoxycyclohexyl)propyltriethoxysilane and the like.

(ii) Fluorine-Containing Compound (D)

Examples of fluorine-containing compounds (D) include the compounds of the following items 1) and 2).

1) Copolymers comprising as monomer components thereof silane group-containing polymerizable unsaturated monomer (g), epoxy-containing polymerizable unsaturated monomer (f), fluorine-containing polymerizable unsaturated monomer (c), and, when required, other polymerizable unsaturated monomer (b).

2) Reaction products of hydroxyl-containing compound (A-2), the aforementioned isocyanato-containing epoxy compound and the aforementioned isocyanato-containing silane compound.

Examples of hydroxyl group-containing compounds (A) which can be used are the same as those of fluorine-free hydroxyl-containing compounds (A-1) and fluorine- and hydroxyl-containing compounds (A-2) already mentioned.

Invention 3

The hydroxyl- and silane group-containing compound (E) for use in Invention 3 of the present invention has in the molecule at least two hydroxyl groups on the average and at least one silane group on the average. Compounds having hydroxyl groups of silane groups less than the above range in number are undesirable since lower curability (gel fraction ratio) will then result. From the viewpoint of weather resistance, water resistance, etc., up to 400 hydroxyl groups are preferably present in the molecule. Further up to 2,500 silane groups are preferably present in the molecule in view of curability (gel fraction ratio). The compound (E) preferably has a number average molecular weight of 1,000 to 200,000, more preferably 3,000 to 80,000. If the molecular weight is less than 1,000, the resulting coating is inferior in weather resistance, whereas if it is over 200,000, the compound (E) is less compatible with other components and therefore undesirable.

(i) Fluorine-Free Compound (E)

Examples of fluorine-free compounds (E) include the following compounds.

1) Copolymers comprising as monomer components thereof hydroxyl-containing polymerizable unsaturated monomer (a), silane group-containing polymerizable unsaturated monomer (g) and, when required, other polymerizable unsaturated monomer (b).

2) Products obtained by reacting hydroxyl-containing compound (A-1) with the isocyanato-containing silane compound described hereinbefore so that the product contains in the molecule at least two hydroxyl groups and at least one silane group on the average.

(ii) Fluorine-Containing Compound (E)

Examples of fluorine-containing compounds (E) include the following compounds.

1) Copolymers comprising as monomer components thereof hydroxyl-containing polymerizable unsaturated monomer (a), silane group-containing polymerizable unsaturated monomer (g), fluorine-containing polymerizable unsaturated monomer (c) and, when required, other polymerizable unsaturated monomer (b).

2) Products obtained by reacting hydroxyl-containing compound (A-2) with the isocyanato-containing silane compound described above so that the product contains in the molecule at least two hydroxyl groups and at least one silane group on the average.

Examples of compounds (B) usable are the same as those already mentioned.

Invention 4

The hydroxyl- and epoxy-containing compound (F) for use in Invention 4 of the present invention has in the molecule at least 2 hydroxyl groups on the average and at least 2, preferably 2 to 300, epoxy groups on the average. Compounds having hydroxyl groups and silane groups less than the above range in number are undesirable since lower curability (gel fraction ratio) will then result. In view of weather resistance, water resistance, etc., it is desirable that up to 2,500 hydroxyl groups be present in the molecule. The compound (F) has a number average molecular weight of 1,000 to 200,000, preferably 3,000 to 80,000. If the molecular weight is less than 1,000, the resulting coating is inferior in weather resistance, whereas if it is over 200,000, the compound (F) is less compatible with other components and therefore undesirable.

(i) Fluorine-Free Compound (F)

Examples of fluorine-free compounds (F) include the following compounds.

1) Copolymers comprising as monomer components thereof hydroxyl-containing polymerizable unsaturated monomer (a), epoxy-containing polymerizable unsaturated monomer (f) and, when required, other polymerizable unsaturated monomer (b).

2) Products obtained by reacting hydroxyl-containing compound (A-1) with the aforementioned isocyanato-containing epoxy compound so that the product contains in the molecule at least 2 hydroxyl groups and at least 2 epoxy groups on the average.

(ii) Fluorine-Containing Compound (F)

Examples of fluorine-containing compounds (F) include the following compounds.

1) Copolymers comprising as monomer components hydroxyl-containing polymerizable unsaturated monomer (a), epoxy-containing polymerizable unsaturated monomer (f), fluorine-containing polymerizable unsaturated monomer (c) and, when required, other polymerizable unsaturated monomer (b).

2) Products obtained by reacting hydroxyl-containing compound (A-2) with the aforementioned isocyanato-containing epoxy compound so that the product has in the molecule at least 2 hydroxyl groups and at least 2 epoxy groups on the average.

With Invention 4, compound (C) are those already described above with respect to Invention 1.

The components described hereinbefore can be prepared by conventional methods. More specifically the reaction between hydroxyl and isocyanato groups, condensation reaction of silane group, copolymerization reaction and the like can be conducted in conventional manner. For example, the reaction between isocyanato group and hydroxyl groups can be effected at a temperature between room temperature and 130° C. for about 30 to about 360 minutes. The condensation reaction of silane group is conducted in the presence of an acid catalyst (for example, hydrochloric acid, sulfuric acid, formic acid, acetic acid or the like) with heating at a temperature of about 40° to about 150° C. for about 1 to about 24 hours. The copolymerization reaction is carried out in the same manner under the same conditions as the reaction for synthesis of acrylic or vinyl resins. Such synthetic reaction can be carried out, for example, by dissolving or dispersing the monomer components in an organic solvent and heating the solution or dispersion in the presence of a radical polymerization initiator at a temperature of about 40° to about 180° C. with stirring. The reaction time usually ranges from about 1 to about 24 hours. Useful organic solvents include those conventionally used and inactive to the monomer or the compound used, such as ether solvents, ester solvents or hydrocarbon solvents. The hydrocarbon solvent is preferably used in combination with a different solvent in view of its dissolving ability. The radical polymerization initiator can be any of polymerization initiators conventionally employed and including peroxides such as benzoyl peroxide and t-butyl peroxy-2-ethylhexanoate and the like and azo compounds such as azobisisobutyronitrile, azobisdimethylvaleronitrile and the like.

In the resin compositions of the invention, components having introduced therein alicyclic epoxy group accelerate the addition reaction of the epoxy group with hydroxyl group, giving a coating with improved curability.

In preparation of resin compositions, the use of the monomer of the formula (5) as the fluorine-containing polymerizable unsaturated monomer (c) provides a polymer with fluorine atoms attached to the main chain, giving a coating enhanced in resistance to weather, acid resistance and other properties. The use of the monomer of the formula (6) affords a polymer with the fluorine atoms attached to the side chain which atoms serve to exhibit remarkable water repellency and resistance to staining.

As to the fluorine content, each of the resin compositions of the invention (Inventions 1 to 4) may contain fluorine-containing polymerizable unsaturated monomer (c) as monomer component in an amount of about 1 to about 70% by weight, preferably about 5 to about 60% by weight, based on the total weight of the components of the composition (i.e., based on the non-volatile content). The resin composition with a fluorine content less than said range gives a coating having low resistance to scratching, staining, weather and acids. On the other hand, the resin composition with a fluorine content exceeding said range incurs a higher production cost and is difficult to manufacture.

The resin compositions of the invention are usually used as dissolved or dispersed in a solvent including hydrocarbon solvent such as toluene and xylene, ketone solvent such as methyl ethyl ketone and methyl isobutyl ketone, ester solvent such as ethyl acetate and butyl acetate, ether solvent such as dioxane and ethylene glycol diethyl ether, alcohol solvent such as butanol and propanol, etc.

The curable composition of the invention comprises each of the resin compositions (Inventions 1-4) of the invention and a metal chelate compound as a curing catalyst.

Useful metal chelate compounds include, for example, aluminum chelate compounds, titanium chelate compounds and zirconium chelate compounds. Among these chelate compounds, those containing, as a ligand for forming a stable chelate ring, a compound capable of forming a keto-enol tautomer.

Examples of the compound capable of forming a keto-enol tautomer are β-diketones (such as acetyl acetone), esters of acetoacetic acids (such as methyl acetoacetate), esters of malonic acids (such as ethyl malonate), ketones having hydroxyl group in the β-position (such as diacetone alcohol), aldehydes having hydroxyl group in the β-position (such as salicylaldehyde), esters having hydroxyl group in the β-position (such as methyl salicylate), etc. The use of esters of acetoacetic acids or esters of β-diketones can achieve desirable results.

The aluminum chelate compound can be suitably prepared for example by admixing the compound capable of forming a keto-enol tautomer with an aluminum alkoxide represented by the formula

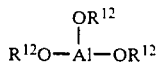 (79)

wherein the groups $R^{12}$ are the same or different and each represent an alkyl having 1 to 20 carbon atoms or alkenyl group usually in a ratio of about 1 to 3 moles of the former per mole of the latter, followed by heating the mixture when so required.

Examples of the alkyl group having 1 to 20 carbon atoms are undecyl, dodecyl, tridecyl, tetradecyl, octadecyl and the like as well as the above alkyl groups having 1 to 10 carbon atoms. Examples of the alkenyl group are vinyl, allyl and the like.

Examples of the aluminum alcoholate having the formula (79) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide and the like. Among them, preferable are aluminum triisopropoxide, aluminum tri-sec-butoxide, aluminum tri-n-butoxide, etc.

The titanium chelate compound can be suitably prepared, for example, by mixing the compound capable of forming a keto-enol tautomer with a titanate represented by the formula

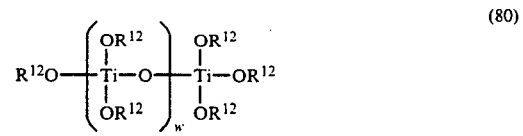 (80)

wherein w is an integer of 0 to 10, and $R^{12}$ is as defined above, usually in a ratio of about 1 to 4 moles of the former per mole of the Ti in the titanate, followed by heating when so required.

Examples of the titanate of the formula (80) wherein w is 0 are tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate, etc. Suitable results can be achieved by use of tetraisopropyl titanate, tetra-n-butyl titanate, tetra-isobutyl titanate, tetra-tert-butyl titanate and the like. Of the titanates wherein w is 1 or more, those which can achieve good results are dimers to hendecamers (w=1 to 10 in the formula (80)) of tetraisopropyl titanate, tetra-n-butyl titanate, tetraisobutyl titanate, tetra-tert-butyl titanate and the like.

The zirconium chelate compound can be suitably prepared, for example, by mixing the compound capable of forming a keto-enol tautomer with a zirconate represented by the formula

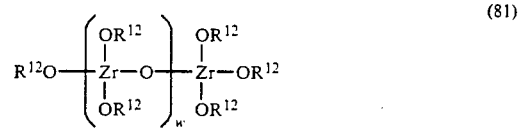 (81)

wherein w and $R^{12}$ are as defined above usually in a ratio of about 1 to 4 moles of the former per mole of the Zr in the zirconate, followed by heating when so required.

Examples of the zirconate represented by the formula (81) are tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate and the like. Desirable results can be obtained by tetraisopropyl zirconate, tetra-n-propyl zirconate, tetraisobutyl zirconate, tetra-n-butyl zirconate, tetra-sec-butyl zircoante, tetra-tert-butyl zirconate or the like. Of the zirconates wherein w is 1 or more, those which can produce desirable results are dimers to hendecamers (w=1 to 10 in the formula (81)) of tetraisopropyl zirconate, tetra-n-propyl zirconate, tetra-n-butyl zirconate, tetraisobutyl zirconate, tetra-sec-butyl zirconate, tetra-tert-butyl zirconate and the like. The chelate compound may contain structural units wherein such zirconates are associated with each other.

Examples of preferred chelate compounds for use in the invention are aluminum chelate compounds such as tris(ethylacetoacetate)aluminum, tris(n-propylacetoacetate)aluminum, tris(isopropylacetoacetate)aluminum, tris(n-butylacetoacetate)aluminum, isopropoxybis(ethylacetoacetate)aluminum, diisopropoxyethylacetoacetate aluminum, tris(acetylacetonato)aluminum, tris(propionylacetonato)aluminum, diisopropoxypropionylacetonato aluminum, acetylacetonato-bis(propionylacetonato)aluminum, monoethylacetoacetate-bis(acetylacetonato)aluminum, tris(acetylacetonato)aluminum and the like; titanium chelate compounds such as diisopropoxybis(ethylacetoacetate)titanate, diisopropoxy-bis(acetylacetonato)titanate, diisopropoxy-bis(acetylacetonato)titanate and the like; and zirconium chelate compounds such as tetrakis(acetylacetonato)zirconium, tetrakis(n-propylacetoacetate)zirconium, tetrakis(acetylacetonato)zirconium, tetrakis(ethylacetoacetate)zirconium and the like.

The aluminum chelate compounds, zirconium chelate compounds or titanium chelate compounds can be used singly or at least two of them are usable in mixture.

With respect to the resin composition according to Invention 1, hydroxyl group-containing compound (A) is used in an amount of 5 to 95% by weight, preferably 20 to 80% by weight, and epoxy group-containing compound (B) is used in an amount of 95 to 5% by weight, preferably 80 to 20% by weight, each based on the total amount of hydroxyl group-containing compound (A) and epoxy group-containing compound (B) combined. If the proportions of these components are outside the above respective ranges, curability at low temperature tends to be impaired. Silane group-containing compound (C) is used in an amount of 0.1 to 150 parts by weight, preferably 1 to 100 parts by weight, based on 100 parts by weight of the total amount of hydroxyl group-containing compound (A) and epoxy group-containing compound (B) combined. If the amount of silane compound (C) is less than 0.1 part by weight, curability of the resulting composition tends to drastically decrease. If the amount of silane compound (C) is more than 150 parts by weight, excess silane compound (C) that remains in the resulting composition tends to reduce the solvent resistance of the resulting coating. In the curable composition containing the above resin composition, the amount of the metal chelate compound is about 0.01 to 30 parts by weight, preferably 0.1 to 5 parts by weight, per 100 parts by weight of the total amount of hydroxyl group-containing compound (A) and epoxy group-containing compound (B) combined. If the amount of the metal chelate compound is less than 0.01 part by weight, curability of the resulting composition is reduced. If the amount is more than 30 parts by weight, the resulting coating tends to have insufficient water resistance.

With respect to the resin composition according to Invention 2, the amount of hydroxyl group-containing compound (A) is 5 to 95% by weight, preferably 20 to 80% by weight, and the amount of epoxy group- and silane group-containing compound (D) is 95 to 5% by weight, preferably 80 to 20% by weight, each based on the total amount of hydroxyl group-containing compound (A) and epoxy group- and silane group-containing compound (D) combined. If the proportions of these components are outside the above respective ranges, the resulting composition tends to have reduced curability, especially at low temperature. In the curable composition containing the above resin composition, the amount of the metal chelate compound is about 0.01 to 30 parts by weight, preferably 0.1 to 5 parts by weight, per 100 parts by weight of the total amount of hydroxyl group-containing compound (A) and epoxy group- and silane group-containing compound (D) combined. If the amount of the metal chelate compound is less than 0.01 part by weight, curability of the resulting composition is reduced. If the amount is more than 30 parts by weight, the resulting coating tends to have insufficient water resistance.

With respect to the resin composition according to Invention 3, the amount of hydroxyl group- and silane group-containing compound (E) is 5 to 95% by weight, preferably 20 to 80% by weight, and the amount of epoxy group-containing compound (B) is 95 to 5% by weight, preferably 80 to 20% by weight, each based on the total amount of hydroxyl group- and silane group-containing compound (E) and epoxy group-containing compound (B) combined. If the proportions of these components are outside the above respective ranges, the resulting composition tends to have reduced curability, especially at low temperature. In the curable composition containing the above resin composition, the amount of the metal chelate compound is about 0.01 to 30 parts by weight, preferably 0.1 to 5 parts by weight, per 100 parts by weight of the total amount of hydroxyl group- and silane group-containing compound (E) and epoxy group-containing compound (B) combined. If the amount of the metal chelate compound is less than 0.01 part by weight, curability of the resulting composition is reduced. If the amount is more than 30 parts by weight, the resulting coating tends to have insufficient water resistance.

With respect to the resin composition according to Invention 4, the amount of hydroxyl group- and epoxy group-containing compound (F) is 5 to 95% by weight, preferably 20 to 80% by weight, and the amount of silane group-containing compound (C) is 95 to 5% by weight, preferably 80 to 20% by weight, each based on the total amount of hydroxyl group- and silane group-containing compound (F) and epoxy group-containing compound (C) combined. If the proportions of these components are outside the above respective ranges, the resulting composition tends to have reduced curability, especially at low temperature. In the curable composition containing the above resin composition, the amount of the metal chelate compound is about 0.01 to 30 parts by weight, preferably 0.1 to 5 parts by weight, per 100 parts by weight of the total amount of hydroxyl group- and epoxy group-containing compound (F) and silane group-containing compound (B) combined. If the amount of the metal chelate compound is less than 0.01 part by weight, curability of the resulting composition is reduced. If the amount is more than 30 parts by weight, the resulting coating tends to have insufficient water resistance.

The curable composition of the present invention may contain the above-mentioned chelating agent, preferably an ester of acetoacetic acid, β-diketone or like compounds to improve the storage stability.

The coating composition of the invention as mixed with known additives selected as required are usable as a topcoat and/or intercoat composition for coating automotive body panels.

When the coating composition of the invention is used as a topcoat composition, for example as a topcoat solid-color composition, a clear topcoat composition in two-coat one-bake coating methods or a topcoat composition in three-coat two-bake coating methods, suitable proportions of the components are about 100 parts by weight of a base resin (i.e., resin composition according to Invention 1, 2, 3 or 4), about 0.1 to about 30 parts by weight of a metal chelate compound and 0 to about 100 parts by weight of a coloring pigment. Useful coloring pigments can be an inorganic or organic coloring pigment of high weatherability conventionally used in topcoat compositions for coating automotive body panels. Among useful coloring pigment are inorganic pigments such as rutile-type titanium oxide, carbon black and the like and organic pigments such as quinacridone red pigment or like quinacridone-type pigments, pigment red and like azo-type pigments, phthalocyanine blue, phthalocyanine green and like phthalocyanine pigments, etc. When used as a clear coating composition in two-coat one-bake coating methods, the coating composition of the invention may be used without a coloring pigment.

When the coating composition of the invention is used as a base coat composition in two-coat one-bake method or as a metallic coating composition in one-coat one-bake coating method, suitable proportions of the components are about 100 parts by weight of a base resin, about 0.1 to about 30 parts by weight of a metal chelate compound, about 2 to about 36 parts by weight of a metallic pigment and 0 to about 40 parts by weight of a coloring pigment. Useful metallic pigments can be conventional ones including flaky metallic powders such as powders of aluminum, copper, micaceous iron oxide, bronze, stainless steel or the like. The coloring pigment for use herein can be any of those exemplified hereinbefore. Further, the coating composition may contain up to about 20 parts by weight of an acrylic dispersion having the core crosslinked by heterogeneous polymerization and obtained by known methods or cellulose acetate butylate as a modified resin for rheology control useful for improving the metallic effect by adjusting the arrangement of metallic pigment.

For use as an intercoat composition for coating automotive body panels, suitable proportions of the components in the coating composition of the invention are about 100 parts by weight of a base resin, about 0.1 to about 30 parts by weight of a metal chelate compound, and about 5 to about 150 parts by weight of a pigment. Useful pigments are titanium oxide, barium sulfate, calcium carbonate, clay and like inorganic pigments and organic pigments for coloration.

When required, the coating composition of the invention, especially the coating composition comprising the resin composition of Invention 2 or 4, may incorporate a low-molecular weight compound of up to 2,000 in number average molecular weight which contains at least two alicyclic epoxy groups per molecule. Such low-molecular weight compound acts as a reactive diluent. When mixed with the coating composition, the compound can lower the viscosity of the composition, thus increasing the solids content thereof. Further the composition forms small quantities of by-products during curing. Therefore, there can be provided a high solid coating composition which is uniformly curable and excellent in other properties. Moreover, the resulting coat is less susceptible to shrinkage during curing and outstanding in surface smoothness.

Useful compounds having at least two alicyclic epoxy groups per molecule and a number average molecular weight of up to 2000 can be selected from epoxy group-containing compound (B).

It is important that the low-molecular weight compound having at least two epoxy groups per molecule have a number average molecular weight of less than 2,000, preferably 160 to 1,000. The compounds of more than 2000 in number average molecular weight have a low compatibility with the base resin used, consequently failing to give a coat excellent in finishing properties and film properties.

A suitable amount of the low-molecular weight compound is 0 to about 100 parts by weight, preferably about 10 to about 60 parts by weight, per 100 parts by weight of the non-volatile content of the coating composition.

The coating composition of the invention can be applied as by electrostatic coating (bell type, REA type or the like), air spraying or other coating methods, using conventional coaters or coating equipment conventionally employed. Before use, the coating composition of the invention is adjusted to a suitable viscosity of about 15 to about 35 seconds (Ford cup No. 4, at 20° C.) for use as intercoat, or about 12 to about 30 seconds (Ford cup No. 4, at 20° C.) for use as topcoat. The viscosity of the composition is suitably variable depending on the coater, the kind of the solvent, coating conditions and the like.

The solvent for diluting the coating composition can be any of those used for conventional coating compositions of the acrylic resin/melamine resin type. Specific examples of such solvent are toluene, xylene and like hydrocarbon solvents; methyl ethyl ketone, methyl isobutyl ketone and like ketone solvents; ethyl acetate, butyl acetate and like ester solvents; dioxane, ethylene glycol diethyl ether and like ether solvents; and butanol, propanol and like alcohol solvents. While these solvents may be used alone or in a suitable combination, alcohol solvents are preferably used in mixture with other solvents in view of solubility of the resin. To enhance the curing rate, an organic solvent having a boiling point of about 150° C. or below is preferred to which, however, useful solvents are not limited in the invention.

The coating composition of the invention is useful as an intercoat composition and/or a topcoat composition for example in a coating method comprising electrophoretically applying a primer to a steel panel treated by chemical conversion, and coating the steel panel with an intercoat composition (optionally omissible) and a topcoat composition, or in a coating method comprising applying to a substrate a primer suitable for a plastics material, drying the coating, and applying an intercoat composition (optionally omissible) and a topcoat composition in this sequence.

In formation of intercoat, the coating composition of the invention is applied to a dry film thickness of about 25 to about 60 μm. In formation of topcoat, the coating composition of the invention is applied to a dry film thickness of about 20 to about 60 μm, preferably about 30 to about 40 μm when used as a solid-color coating composition in the one-coat one-bake coating method, a metallic coating composition in the one-coat one-bake method, a clear topcoat composition in the two-coat one-bake method or a clear topcoat composition in the three-coat two-bake method. The coating composition of the invention is applied to a dry film thickness of about 10 to about 25 μm, preferably about 10 to about 20 μm when used as a metallic base coat composition in the two-coat one-bake coating method.

The coating composition of the invention can readily undergo curing reaction by crosslinking at a low temperature of 140° C. or lower. For example, when the coating composition of the invention is cured at room temperature without any heating, it can be sufficiently cured in about 8 hours to 7 days after application. When the coating composition of the invention is cured by heating at about 40° to 100° C., it can be fully cured in 5 minutes to 3 hours after application.

The reason why the curable composition of the invention has excellent curability at low temperature would presumably be as follows. In the first step reaction, the metal chelate compound reacts with silane groups to form bonds of the formula

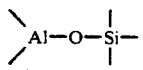

and the bonds are coordinated with other silanol groups (alkoxysilane group acyloxysilane group and the like are converted to silanol group by the action of moisture in the air) to form bonds of the following formula

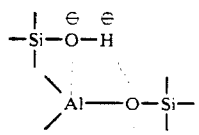

and thereby to polarize the silanol groups. The polarized silanol groups then react with epoxy groups to form a structure of the formula

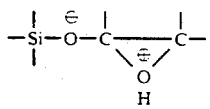

and this structure reacts with hydroxyl groups to form a structure of the formula

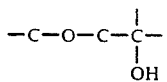

and this reaction between the above structure and hydroxyl group proceeds at a relatively low temperature.

It is presumed that since the curable composition of the invention contains a hydroxyl group-containing compound as one of the essential components and further contains epoxy groups, silane groups and a metal chelate compound, the above reactions quickly proceed, whereby the resin composition of the invention has excellent curability at low temperatures.

The fluorine component used in the curable composition of the invention is poor in compatibility with the alkoxy- and epoxy-containing components, and is unlikely to inhibit the reaction between alkoxy and epoxy groups, hence effective in exhibiting a high curability. Further, the fluorine atoms chemically attached to the cured product are chemically stable to extraneous attack as by light, heat, water, or the like, and serve to give a cured product which is low in surface energy.

The composition of the invention can achieve the following remarkable results.

(1) The composition of the invention gives a coat excellent in surface smoothness and distinctness-of-image gloss. The ionic polymerization reaction and addition reaction predominantly takes place during the curing reaction of the composition and only a significantly small amount of by-products are formed. In addition, the coating composition of the invention undergoes a low degree of volumetric shrinkage during curing and thus can form a coat having a surface without fine irregularities, namely a high grade of surface smoothness, hence excellent in distinctness-of-image gloss.

(2) The composition of the invention is of the one-package type and has an excellent low temperature curability. The composition of the invention is satisfactorily crosslinkable at a temperature of about 80° C. when baked for 30 to 40 minutes.

(3) The composition of the invention which is of the one-package type is stable as a coating material and low in toxicity.

(4) The coat formed from the composition of the invention is excellent in acid resistance by the fluorine component and polysiloxane bond in the base resin.

(5) The coat formed from the composition of the invention have an excellent resistance to staining. Thus, the coating formed from the composition of the invention is highly resistant to pollutants due to various factors including a high density of crosslinking and high water repellency caused by the polysiloxane bonds and fluorine component present in the base resin.

(6) The coat formed from the composition of the polysiloxane bonds and the fluorine component present in the base resin, the resin has a high hydrophobicity and a good water repellency. In particular, the fluorine component present at the side chain of the base resin reduces the surface energy of the coat, thereby providing the coating with a high water repellency over an automotive body panel.

(7) The coat formed from the composition of the invention is outstanding in scratching resistance. The coat of the composition of the invention has a high scratching resistance because of the synergistic effect produced by high density of crosslinking and the reduction of frictional resistance attributable to polysiloxane bonds and C—F bonds present in the base resin.

(8) The coat formed from the composition of the invention has a high resistance to weather (namely free of loss of gloss, cracking, chalking, blistering, etc.). The coating composition applied is cured with little difference in the degree of curing in the surface and the interior of the coat, leaving substantially no portion uncured. This advantage is due to the presence of C—F bonds excellent in chemical stability, and due to the fact that small amounts of by-products are produced during curing because of the concurrent occurrence of three types of crosslinking reactions, i.e., the ion polymerization reaction of epoxy groups, the addition reaction of epoxy groups to silanol and hydroxyl groups and the condensation reaction of silanol groups. The coat thus uniformly cured exhibits excellent resistance to weather.

EXAMPLE

For a better understanding of the present invention, examples are given below.

First, copolymer preparation examples are given.

PREPARATION EXAMPLE 1

Preparation of Copolymer (1)

The following monomers were placed into a 400-ml stainless steel autoclave equipped with a stirrer.

| | |
|---|---|
| $CH_2=CHO(CH_2)_4OH$ | 15 parts by weight |
| $CH_2=CHO-\text{cyclohexyl}$ | 30 parts by weight |
| $CH_2=CHOC_2H_5$ | 5 parts by weight |

Also placed into the autoclave were the following compounds.

| | |
|---|---|
| Methyl isobutyl ketone | 200 parts by weight |
| Azobisisobutyronitrile | 2 parts by weight |
| Sodium borate | 0.5 part by weight |

The air in the autoclave was then replaced by nitrogen, the contents were cooled for solidification, and the autoclave was evacuated. Into the autoclave was thereafter placed 50 parts by weight of $CF_2=CFCl$, and the autoclave was gradually heated until the internal temperature reached 60° C. The mixture was thereafter reacted with stirring for at least 16 hours. When the internal pressure of the autoclave dropped to not higher than 1 kg/cm², the autoclave was cooled with ice to terminate the reaction. The resulting resin solution was placed into an excessive amount of heptane to cause a resin to separate out, followed by washing and drying to obtain 93 g of resin. Yield 93%. The resin was 5,000 in number average molecular weight as determined by GPC (gel permeation chromatography). The resin obtained was dissolved in the same amount of xylene as the resin to obtain a resin solution containing 50% by weight of nonvolatile component.

PREPARATION EXAMPLES 2-5

Copolymers (2) to (5) were prepared in the same manner as in Preparation Example 1. Table 1 shows the amounts (parts by weight) of the monomers used, and the number average molecular weight (Mn) of each copolymer as determined by GPC.

TABLE 1

| | Copolymer | | | | |
|---|---|---|---|---|---|
| | (1) | (2) | (3) | (4) | (5) |
| $CH_2=CHO(CH_2)_4OH$ | 15 | | | | |
| $CH_2=CHCH_2O(CH_2)_2OH$ | | | | | 10 |
| $CH_2=CHOCH_2$-cyclohexyl-O (epoxy) | | 35 | | | |
| $CH_2=CHCH_2OCH_2$-bicyclic-O (epoxy) | | | | 20 | |
| $CH_2=CHSi(OH)(OCH_3)_2$ | | | 20 | | |
| $CH_2=CHCH_2O(CH_2)_3Si(OCOCH_3)_3$ | | | | 20 | |
| $CH_2=CHO(CH_2)_3Si(OCH_3)_3$ | | | | | 30 |
| $CH_2=CHO$-cyclohexyl | 30 | 20 | 10 | | 5 |
| $CH_2=CHOC_2H_5$ | 5 | 15 | | | |
| $CH_2=CHOCCH_3$ ($\parallel O$) | | | | 10 | |
| $CH_2=CHOCC_3H_7$ ($\parallel O$) | | | | 10 | 10 |
| $CF_2=CFCl$ | 50 | 45 | 45 | 40 | 45 |
| $CF_2=CF_2$ | | | 10 | | |
| Mn | 5000 | 4200 | 6800 | 5000 | 10500 |

PREPARATION EXAMPLES 6-15

Acrylic copolymer varnishes (copolymers (6) to (15)) of the compositions listed in Table 2 below were prepared by the usual procedure for preparing acrylic copolymer varnishes. These varnishes are each in the form of a xylene solution having a nonvolatile content of 50 wt. %. Table 2 also shows the number average molecular weight of each varnish as determined by GPC.

TABLE 2

| | Copolymer |
|---|---|

TABLE 2-continued
| | (6) | (7) | (8) |
|---|---|---|---|
| $CH_2=CHCOO(CH_2)_2OH$ FM-3 | | | 30 |
| | | 30 | |
| 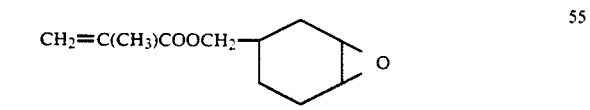 | 55 | | |
| 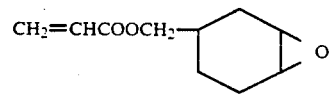 | | | |
| 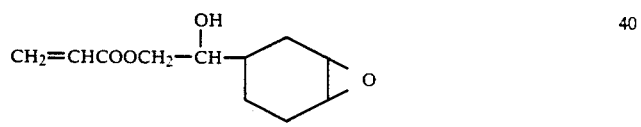 | | 40 | |
| 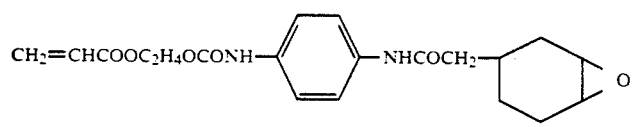 | | | |
| $CH_2=C(CH_3)COOCH_2CH—CH_2$ \ / O | | | |
| Macromonomer B | | | |
| $CH_2=C(CH_3)COOC_3H_6-Si(OCH_3)_3$ | | | |
| $CH_2=CHCOOC_3H_6-Si(N(CH_3)_2)_3$ | | | |
| 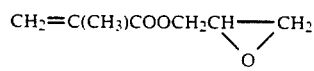 | | | |
| $CH_2=CHCOOC_3H_6-Si(ON(CH_3)_2)_3$ | | | |
| Styrene | 15 | | 30 |
| n-Butyl methacrylate | 10 | 20 | 40 |
| $CH_2=CHCOOC_2H_4C_8F_{17}$ | 20 | 10 | |
| $CH_2=C(CH_3)COOC_2H_4C_8F_{17}$ | | | |
| Mn | 5000 | 5000 | 6000 |
| | Copolymer | | |
|---|---|---|---|
| | (9) | (10) | (11) |
| $CH_2=CHCOO(CH_2)_2OH$ FM-3 | | | |
| 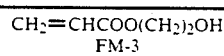 | | | |
| 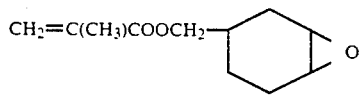 | | | |
| 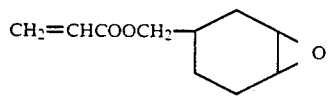 | | | |
| 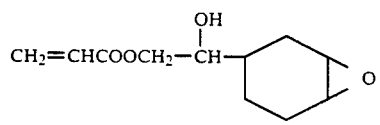 | 60 | | |
| 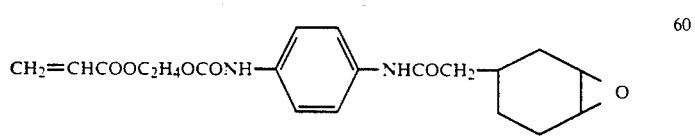 | | | |

TABLE 2-continued

| | | | |
|---|---|---|---|
| CH$_2$=C(CH$_3$)COOCH$_2$CH—CH$_2$ (epoxide) | | | |
| | | | |
| Macromonomer B | | 40 | |
| CH$_2$=C(CH$_3$)COOC$_3$H$_6$—Si(OCH$_3$)$_3$ | | | 20 |
| CH$_2$=CHCOOC$_3$H$_6$—Si(N(CH$_3$)$_2$)$_3$ | | | |
| CH$_2$=CH—C$_6$H$_4$—C$_3$H$_6$—SiON(CH$_3$)$_2$ (CH$_3$)$_2$ | | | |
| CH$_2$=CHCOOC$_3$H$_6$—Si(ON(CH$_3$)$_2$)$_3$ | | | |
| Styrene | 20 | 10 | 30 |
| n-Butyl methacrylate | 20 | 50 | 50 |
| CH$_2$=CHCOOC$_2$H$_4$C$_8$F$_{17}$ | | | |
| CH$_2$=C(CH$_3$)COOC$_2$H$_4$C$_8$F$_{17}$ | | | |
| Mn | 5000 | 5500 | 6500 |

| | Copolymer | | |
|---|---|---|---|
| | (12) | (13) | (14) |
| CH$_2$=CHCOO(CH$_2$)$_2$OH FM-3 | | | 20 |
| CH$_2$=C(CH$_3$)COOCH$_2$-cyclohexyl-epoxide | | | |
| CH$_2$=CHCOOCH$_2$-cyclohexyl-epoxide | | | |
| CH$_2$=CHCOOCH$_2$-CH(OH)-cyclohexyl-epoxide | | | |
| CH$_2$=CHCOOC$_2$H$_4$OCONH-C$_6$H$_4$-NHCOCH$_2$-cyclohexyl-epoxide | | | |
| CH$_2$=C(CH$_3$)COOCH$_2$CH—CH$_2$ (epoxide) | | 40 | |
| Macromonomer B | | | |
| CH$_2$=C(CH$_3$)COOC$_3$H$_6$—Si(OCH$_3$)$_3$ | | | |
| CH$_2$=CHCOOC$_3$H$_6$—Si(N(CH$_3$)$_2$)$_3$ | 20 | | |
| CH$_2$=CH—C$_6$H$_4$—C$_3$H$_6$—SiON(CH$_3$)$_2$ (CH$_3$)$_2$ | | 20 | |
| CH$_2$=CHCOOC$_3$H$_6$—Si(ON(CH$_3$)$_2$)$_3$ | | | 20 |
| Styrene | 20 | 10 | 20 |
| n-Butyl methacrylate | 60 | 30 | 40 |
| CH$_2$=CHCOOC$_2$H$_4$C$_8$F$_{17}$ | | | |
| CH$_2$=C(CH$_3$)COOC$_2$H$_4$C$_8$F$_{17}$ | | | |
| Mn | 6500 | 10000 | 6300 |

| | Copolymer (15) |
|---|---|
| CH$_2$=CHCOO(CH$_2$)$_2$OH FM-3 | 40 |

TABLE 2-continued

| Structure | Value |
|---|---|
| $CH_2=C(CH_3)COOCH_2-\text{(cyclohexene oxide)}$ | |
| $CH_2=CHCOOCH_2-\text{(cyclohexene oxide)}$ | 40 |
| $CH_2=CHCOOCH_2-CH(OH)-\text{(cyclohexene oxide)}$ | |
| $CH_2=CHCOOC_2H_4OCONH-\text{C}_6H_4-NHCOCH_2-\text{(cyclohexene oxide)}$ | |
| $CH_2=C(CH_3)COOCH_2CH-CH_2$ (epoxide) | |
| Macromonomer B | |
| $CH_2=C(CH_3)COOC_3H_6-Si(OCH_3)_3$ | |
| $CH_2=CHCOOC_3H_6-Si(N(CH_3)_2)_3$ | |
| $CH_2=CH-\text{C}_6H_4-C_3H_6-Si(ON(CH_3)_2)(CH_3)_2$ | |
| $CH_2=CHCOOC_3H_6-Si(ON(CH_3)_2)_3$ | |
| Styrene | |
| n-Butyl methacrylate | 20 |
| $CH_2=CHCOOC_2H_4C_8F_{17}$ | |
| $CH_2=C(CH_3)COOC_2H_4C_8F_{17}$ | |
| Mn | 4700 |

"FM-3 monomer" listed in Table 2 is a hydroxyl-containing caprolactone-modified methacrylic acid ester (product of Daicel Ltd.), which is 472 in average molecular weight and 119 KOH mg/g in theoretical hydroxyl value.

As to "macromonomer B" used for preparing Copolymer (10) in Table 2, it was prepared as follows.

| Synthesis Example of Macromonomer B | |
|---|---|
| Phenyltrisilanol | 7800 g |
| $\text{C}_6\text{H}_5-Si(OH)_3$ | (50 moles) |
| γ-Acryloxypropyltrisilanol | 200 g |
| $CH_2=CHCOOC_3H_6Si(OCH_3)_3$ | (1 mole) |
| Toluene | 4500 g |

The mixture of above compounds was reacted at 117° C. for 3 hours, and the reaction mixture was dehydrated, giving a polysiloxane macromonomer, which was 7,000 in number average molecular weight and had one vinyl group and 5 to 10 silanol groups per molecule on the average.

The amount listed in Table 2 is the amount of component effective as the macromonomer.

PREPARATION EXAMPLE 16

Preparation of Copolymer (16)

A polyester polyol was prepared by the following method.

The compounds given below were placed into a glass flask equipped with a stirrer and a water separator.

| | |
|---|---|
| Phthalic anhydride | 192 parts by weight |
| Hexahydrophthalic anhydride | 256 parts by weight |
| Adipic acid | 107 parts by weight |
| Neopentyl glycol | 357 parts by weight |
| Trimethylolpropane | 88 parts by weight |

The mixture was heated to raise the temperature from 160° C. to 230° C. over a period of 3 hours and thereafter maintained at 230° C. for 1 hour. With addition of 50 g of xylol, the mixture was further reacted until the acid value thereof became 8. The reaction mixture was cooled and then diluted with a solvent mixture of xylene/n-butanol (4/1) to a solids concentration of 50 wt. %. The resin obtained was about 3,500 in number average molecular weight as determined by GPC.

PREPARATION EXAMPLE 17

Preparation of Copolymer (17)

Preparation of Copolymer (i)

The same procedure as in Preparation Example 8 was repeated except that $CH_2=CHCOOC_2H_4OH$ was replaced by the same amount of $CH_2=C(CH_3)COOC_2H_4NCO$ to obtain copolymer (i) (50% xylene solution, Mn=6,000).

The following solution and compounds were placed into a 400-ml glass flask equipped with a stirrer.

| | |
|---|---|
| Solution of copolymer (i) | 200 parts by weight |
| $(CH_3O)_3SiC_3H_6$—OH | 35 parts by weight |
| Xylene | 35 parts by weight |

The mixture was heated at 90° C. with stirring for 5 hours to effect an addition reaction between —OH group and —NCO IR absorption spectrum indicated disappearance of absorption of —NCO group and —OH group. This revealed that $Si(OCH_3)_3$ group and —OH group. This revealed that —$Si(OCH_3)_3$ group had been introduced into copolymer (i).

PREPARATION EXAMPLE 18

Preparation of Copolymer (18)

The following solution and compounds were placed into a 400-ml glass flask equipped with a stirrer.

| | |
|---|---|
| Solution of copolymer (1) (50% nonvolatile content) | 200 parts by weight |
| $(CH_3O)_3SiC_3H_6NCO$ | 13.3 parts by weight |
| 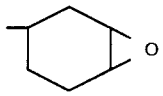 | 23.5 parts by weight |
| Xylene | 36.8 parts by weight |

The mixture was heated at 90° C. with stirring for 5 hours to effect an addition reaction between —OH group and —NCO group.

IR absorption spectrum indicated disappearance of absorption of —OH group at 3530 cm$^{-1}$. This revealed that —$Si(OCH_3)_3$ group and

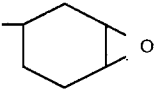

group had been introduced into copolymer (1) of Preparation Example 1.

PREPARATION EXAMPLE 19

Preparation of Copolymer (19)

The materials given below were placed into a 400-ml glass flask equipped with a stirrer.

| | |
|---|---|
| Solution of copolymer (2) | 200 parts by weight |
| (50% nonvolatile content) | |
| $(H_3CO)_3SiC_3H_6SH$ | 45 parts by weight |
| Xylene | 45 parts by weight |

The mixture was heated at 90° C. with stirring for 7 hours to effect an addition reaction between

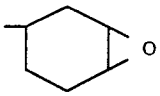

group and —SH group.

IR absorption spectrum indicated complete disappearance of absorption of epoxy group, revealing that —$Si(OCH_3)_3$ group had been introduced into copolymer (2) of Preparation Example 2.

PREPARATION EXAMPLE 20

Preparation of Copolymer (20)

The materials given below were placed into a 400-ml glass flask equipped with a stirrer.

| | |
|---|---|
| Solution of copolymer (i) | 200 parts by weight |
| ![epoxy-CH2OH structure] | 25 parts by weight |
| Xylene | 25 parts by weight |

The mixture was heated at 100° C. with stirring for 4 hours to effect an addition reaction between —OH group and —NCO group.

IR absorption spectrum indicated complete disappearance of absorption of —NCO group and —OH group, revealing that group had been introduced into copolymer (i).

PREPARATION OF BASE COAT A

The base coat composition to be used in combination with a two-coat one-bake clear coat composition was prepared by the following procedure.

| Preparation of Siloxane Macromonomer | |
|---|---|
| Methyltrimethoxysilane | 2720 g (20 moles) |
| γ-Methacryloxypropyltrimethoxysilane | 256 g (1 mole) |
| Deionized water | 1134 g |
| 30% HCl | 2 g |
| Hydroquinone | 1 g |

The mixture of above ingredients was reacted at 80° C. for 5 hours to obtain a polysiloxane macromonomer, which was 2,000 in number average molecular weight and had 1 vinyl group (polymerizable unsaturated group) and 4 silanol groups per molecule on the average.

A copolymer was prepared using the macromonomer obtained.

| | |
|---|---|
| Polysiloxane macromonomer | 150 g |
| 2-Hydroxyethyl acrylate | 100 g |
|  | 150 g |
| n-Butyl acrylate | 500 g |
| Styrene | 100 g |
| Azobisisobutyronitrile | 10 g |

The above mixture was added dropwise to 1,000 g of mixture of butanol and xylene in equal amounts by weight at 120° C. to effect polymerization and obtain a transparent copolymer, which was about 30,000 in number average molecular weight.

Using the obtained copolymer, a metallic base coating composition of the following components useful in the two-coat one-bake method was prepared using the components in the amounts listed below (calculated as solids).

| | |
|---|---|
| Above copolymer | 95 parts by weight |
| Cellulose acetate butyrate | 5 parts by weight |
| Aluminum paste #55-519 | 13 parts by weight |
| (product of Toyo Aluminum Co., Ltd.) | |
| Aluminum trisacetylacetone | 1 part by weight |

The above mixture was adjusted to a viscosity of 13 seconds (Ford Cup No.4, 20° C.) with a 80/20 mixture of toluene/Swasol #1500 (tradename, Cosmo Oil Co., Ltd.) and applied.

PREPARATION OF COATING COMPOSITIONS

Using the copolymers obtained in Preparation Examples described hereinbefore, automotive topcoating compositions were prepared. The obtained topcoating compositions were solid color ones (white) and clear ones useful in the two-coat one-bake method.

Table 3 below shows examples of preparation of solid color (white) compositions (Nos. S-1 to S-6). Titanium oxide was dispersed in a copolymer solution for 1 hour using a paint shaker. The pigment used in the solid color composition was used in an amount of 80 parts by weight per 100 parts by weight of the resin calculated as solids.

Table 4 below shows preparation examples of clear coating compositions (Nos. M-1 to M-13) useful in the two-coat one-bake method.

The amount of copolymers shown in Tables 3 and 4 are expressed in % by weight of active ingredients (resins). Tables 3 and 4 also shows the amount of pigment and metal chelate compound expressed in % by weight of the resin content (PHR).

The metal chelate compound used are as follows:

| | |
|---|---|
| Chelate compound I | tris(acetylacetonato)aluminum |
| Chelate compound II | tetrakis(acetylacetonato)zirconium |
| Chelate compound III | diisopropoxy-bis(ethylacetoacetato)titanate |

Further in Tables 3 and 4, "Oligomer A" and "TiO$_2$" mean the following.

1) Oligomer A = Alicyclic oxirane group-containing

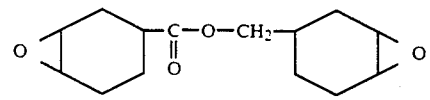

2) TiO$_2$ = pigment, titanium white, "Titanium oxide JR-602" (product of Teikoku Kakoh K.K.)

TABLE 3

| Coating composition No. | S-1 | S-2 | S-3 | S-4 | S-5 | S-6 |
|---|---|---|---|---|---|---|
| Copolymer (1) | 50 | | 20 | | | |
| Copolymer (2) | | | | | | |
| Copolymer (3) | | 40 | 20 | | 40 | |
| Copolymer (4) | | | | | | |
| Copolymer (5) | | | | 50 | | |
| Copolymer (6) | | | | | | 30 |
| Copolymer (7) | | | | | | |
| Copolymer (8) | | | | | | |
| Copolymer (9) | 30 | 20 | | 20 | | 20 |
| Copolymer (10) | | | | | | |
| Copolymer (11) | | | | | | |
| Copolymer (12) | 20 | | | | | |
| Copolymer (13) | | | 30 | | | |
| Copolymer (14) | | | | | | 30 |
| Copolymer (15) | | | | | 30 | |
| Copolymer (16) | | 20 | | | | |
| Oligomer A: 1) | 0 | 20 | 30 | 30 | 30 | 20 |
| Chelate compound I | 1 | | 1 | | 1 | 1 |
| Chelate compound II | | 1 | | | | |
| Chelate compound III | | | | 1 | | |
| TiO$_2$ 2) | 80 | 80 | 80 | 80 | 80 | 80 |

TABLE 4

| Coating Composition No. | M-1 | M-2 | M-3 | M-4 | M-5 | M-6 | M-7 | M-8 | M-9 | M-10 | M-11 | M-12 | M-13 |
|---|---|---|---|---|---|---|---|---|---|---|---|---|---|
| Copolymer (1) | 40 | | 25 | | | | 40 | | 40 | 40 | 50 | | |
| Copolymer (2) | | 40 | 25 | | | | | 40 | | | | 40 | |
| Copolymer (3) | | | | | | | | | 20 | | | | |
| Copolymer (4) | | | | 60 | | | | | | | | | |
| Copolymer (5) | | | | | 50 | | | | | | | | 50 |
| Copolymer (6) | | | | | | | 20 | | 20 | | | | |
| Copolymer (7) | | | | | | 50 | | 10 | | | | | |
| Copolymer (8) | | 20 | | 40 | | | | | | | | 20 | |
| Copolymer (9) | 20 | | | | 30 | | | | | 20 | | | |
| Copolymer (10) | | 20 | 30 | | | | 20 | | | | | | |
| Copolymer (11) | | | | | | 30 | | 20 | | | | | |
| Copolymer (12) | 20 | | | | | | | | | | | | |
| Copolymer (13) | | | | | | | | | | | | | |
| Copolymer (14) | | | | | | | | | | | | | |
| Copolymer (15) | | | | | | | | | 10 | | | | |

TABLE 4-continued

| Coating Composition No. | M-1 | M-2 | M-3 | M-4 | M-5 | M-6 | M-7 | M-8 | M-9 | M-10 | M-11 | M-12 | M-13 |
|---|---|---|---|---|---|---|---|---|---|---|---|---|---|
| Copolymer (16) | | | | | | | | | | | | | |
| Copolymer (17) | | | | | | | | | | 20 | | | |
| Copolymer (18) | | | | | | | | | | | 50 | | |
| Copolymer (19) | | | | | | | | | | | | 20 | |
| Copolymer (20) | | | | | | | | | | | | | 30 |
| Oligomer A: 1) | 20 | 20 | 20 | 0 | 20 | 20 | 20 | 20 | 20 | 20 | 0 | 20 | 20 |
| Chelate compound I | 1 | | 1 | 1 | | 1 | 1 | 1 | 1 | 1 | 1 | 1 | 1 |
| Chelate compound II | | 1 | | | | | | | | | | | |
| Chelate compound III | | | | | 1 | | | | | | | | |

Performance Test I

To a dull-finished steel panel treated by chemical conversion was applied an epoxy resin-type cationic electrodeposition coating composition to a film thickness of about 25 μm and cured with heating at 170° C. for 30 minutes. Lugabake AM as an intercoating composition (tradename for an automotive polyester resin/melanine resin coating composition manufactured by Kansai Paint Co., Ltd.) was applied to the panel to a dry film thickness of about 30 μm and baked at 140° C. for 30 minutes. The coating surface was subjected to wet-grinding with #400 sandpaper, dried and wiped with a piece of cloth saturated with petroleum benzine to give a substrate specimen.

The solid color topcoating compositions prepared above were adjusted to a viscosity of 22 seconds (Ford Cup No.4, 40° C.) with Swasol #1000 (trademark for a product of Cosmo Oil Co., Ltd., a mixture of petroleum type solvents). The diluted composition was applied to the substrate specimen to a dry film thickness of 40 to 50 μm, set at room temperature for 10 minutes and baked at 140° C. for 30 minutes to give a test coated panel.

Lugabake AM white (coating composition No. S-7) was applied in the same manner as above to give a test coated panel for comparison.

Table 5 shows the test results. In Table 5, coating Composition No. S-7 is a comparative example.

TABLE 5

| Coating composition | S-1 | S-2 | S-3 | S-4 | S-5 | S-6 | S-7 |
|---|---|---|---|---|---|---|---|
| Baking Temp. (°C.) | 140 | 140 | 140 | 140 | 140 | 140 | 140 |
| Gloss | 90 | 91 | 90 | 89 | 90 | 94 | 92 |
| Pencil hardness 3) | H | H | F | H | H | H | H |
| DOI gloss 4) | 89 | 88 | 87 | 86 | 90 | 90 | 84 |
| Xylol resistance 5) | ⊚ | ⊚ | ⊚ | ⊚ | ⊚ | ⊚ | ○ |
| Adhesion 6) | 100/100 | 100/100 | 100/100 | 100/100 | 100/100 | 100/100 | 100/100 |
| Impact resistance 7) | 30 | 35 | 30 | 30 | 30 | 30 | 25 |
| Acid resistance 8) | ⊚ | ⊚ | ⊚ | ⊚ | ⊚ | ⊚ | X |
| Scratching resist. 9) | ○ | ○ | ○ | ○ | ⊚ | ○ | Δ |
| Water resistance 10) | ⊚ | ⊚ | ⊚ | ⊚ | ⊚ | ⊚ | ⊚ |
| Staining resist. 11) | ○ | ○ | ○ | ○ | ⊚ | ⊚ | X |
| Water repellency 12) | 83 | 81 | 82 | 83 | 85 | 92 | 79 |
| Weatherability 13) | ⊚ | ⊚ | ⊚ | ⊚ | ⊚ | ○ | Chalking |
| Storage stability 14) | ⊚ | ⊚ | ⊚ | ⊚ | ⊚ | ⊚ | ⊚ |

Performance Test II

A primer, "Soflex No. 2500" (product of Kansai Paint Co., Ltd., Japan) was applied to a substrate of polypropylene to a thickness of 15 to 20 μm and baked at 80° C. for 20 minutes. Then the above solid color topcoating composition was applied to the panel to a thickness of 40 to 50 μm, and baked at 80° C. for 30 minutes.

For comparison, Retan PG-80 white (trademark for a product of Kansai Paint Co., Ltd., Coating Composition No. S-8) was used as a solid color topcoating composition in the same manner as above.

TABLE 6

| Coating composition | Present invention | | Comparison |
|---|---|---|---|
| | S-1 | S-5 | S-8 |
| Gloss | 87 | 97 | 89 |
| Pencil hardness 3) | F | F | F |
| DOI gloss 4) | 87 | 91 | 85 |
| Xylol resistance 5) | ○ | ○ | ○ |
| Adhesion 6) | 100/100 | 100/100 | 100/100 |
| Impact resistance 7) | 30 | 30 | 30 |
| Acid resistance 8) | ⊚ | ⊚ | ⊚ |
| Scratching resist. 9) | ○ | ○ | Δ |
| Water resistance 10) | ⊚ | ⊚ | ⊚ |
| Staining resist. 11) | ○ | ○ | Δ |
| Water repellency 12) | 84 | 86 | 76 |
| Weatherability 13) | ⊚ | ⊚ | ⊚ |
| Storage stability 14) | ⊚ | ⊚ | X |

Performance Test III

The base coating composition A was applied to the substrate specimen used in Performance Test I above to a dry film thickness of 15 to 20 μm and was left to stand for about 5 minutes. Clear topcoating compositions (Nos. M-1 to M-13) diluted with Swasol #1000 to a viscosity of 22 seconds were applied to the coated specimens to a dry film thickness of 35 to 45 μm. After application of the topcoating compositions, the coated substrates were allowed to stand at room temperature for about 10 minutes and baked at 100° C. or 140° C. for 30 minutes.

For comparison, to the substrate specimens were also applied Magicron #1000 (silver) as a base coating composition and Magicron #1000 (clear) as a clear topcoating composition (product of Kansai Paint Co., Ltd., acryl/melamine resin-type coating composition, No. M-14). The coated substrate was baked in the same manner but was not cured at 100° C.

Table 7 shows the test results.

TABLE 7

| Coating composition | M-1 | | M-2 | | M-3 | | M-4 | |
|---|---|---|---|---|---|---|---|---|
| Baking Temp. (°C.) | 100 | 140 | 100 | 140 | 100 | 140 | 100 | 140 |
| Gloss | 92 | 91 | 95 | 94 | 94 | 93 | 91 | 92 |
| Pencil hardness 3) | F | H | F | H | F | H | F | F |
| DOI gloss 4) | 87 | 86 | 88 | 87 | 89 | 90 | 88 | 88 |
| Xylol resistance 5) | ○ | ⊙ | ○ | ⊙ | ⊙ | ⊙ | ○ | ⊙ |
| Adhesion 6) | 100/100 | 100/100 | 100/100 | 100/100 | 100/100 | 100/100 | 100/100 | 100/100 |
| Impact resistance 7) | 35 | 30 | 35 | 30 | 35 | 30 | 30 | 30 |
| Acid resistance 8) | ⊙ | ⊙ | ⊙ | ⊙ | ⊙ | ⊙ | ⊙ | ⊙ |
| Scratching resistance 9) | ○ | ○ | ○ | ○ | ○ | ○ | ○ | ○ |
| Water resistance 10) | ⊙ | ⊙ | ⊙ | ⊙ | ⊙ | ⊙ | ⊙ | ⊙ |
| Staining resistance 11) | ○ | ○ | ○ | ○ | ○ | ○ | ○ | ○ |
| Water repellency 12) | 82 | 83 | 85 | 86 | 85 | 87 | 80 | 81 |
| Weatherability 13) | ⊙ | ⊙ | ⊙ | ⊙ | ⊙ | ⊙ | ⊙ | ⊙ |
| Storage stability 14) | ⊙ | | ⊙ | | ⊙ | | ⊙ | |

| Coating composition | M-5 | | M-6 | | M-7 | | M-8 | |
|---|---|---|---|---|---|---|---|---|
| Baking Temp. (°C.) | 100 | 140 | 100 | 140 | 100 | 140 | 100 | 140 |
| Gloss | 89 | 90 | 95 | 96 | 92 | 92 | 91 | 90 |
| Pencil hardness 3) | F | H | F | H | F | H | F | H |
| DOI gloss 4) | 84 | 85 | 87 | 86 | 89 | 90 | 88 | 91 |
| Xylol resistance 5) | ○ | ⊙ | ○ | ⊙ | ○ | ⊙ | ○ | ⊙ |
| Adhesion 6) | 100/100 | 100/100 | 100/100 | 100/100 | 100/100 | 100/100 | 100/100 | 100/100 |
| Impact resistance 7) | 30 | 30 | 30 | 30 | 30 | 30 | 35 | 30 |
| Acid resistance 8) | ⊙ | ⊙ | ○ | ○ | ⊙ | ⊙ | ⊙ | ⊙ |
| Scratching resistance 9) | ○ | ○ | ○ | ○ | ○ | ○ | ○ | ⊙ |
| Water resistance 10) | ⊙ | ⊙ | ⊙ | ⊙ | ⊙ | ⊙ | ⊙ | ⊙ |
| Staining resistance 11) | ○ | ○ | ○ | ○ | ⊙ | ⊙ | ○ | ⊙ |
| Water repellency 12) | 81 | 82 | 92 | 91 | 95 | 96 | 93 | 92 |
| Weatherability 13) | ⊙ | ⊙ | ○ | ○ | ⊙ | ⊙ | ⊙ | ⊙ |
| Storage stability 14) | ⊙ | | ⊙ | | ⊙ | | ⊙ | |

| Coating composition | M-9 | | M-10 | | M-11 | | M-12 | |
|---|---|---|---|---|---|---|---|---|
| Baking Temp. (°C.) | 100 | 140 | 100 | 140 | 100 | 140 | 100 | 140 |
| Gloss | 89 | 91 | 91 | 90 | 88 | 89 | 91 | 92 |
| Pencil hardness 3) | F | H | F | H | F | H | F | H |
| DOI gloss 4) | 90 | 92 | 89 | 88 | 90 | 90 | 87 | 88 |
| Xylol resistance 5) | ○ | ⊙ | ⊙ | ⊙ | ⊙ | ⊙ | ⊙ | ⊙ |
| Adhesion 6) | 100/100 | 100/100 | 100/100 | 100/100 | 100/100 | 100/100 | 100/100 | 100/100 |
| Impact resistance 7) | 35 | 30 | 30 | 30 | 30 | 30 | 30 | 30 |
| Acid resistance 8) | ⊙ | ⊙ | ⊙ | ⊙ | ⊙ | ⊙ | ⊙ | ⊙ |
| Scratching resistance 9) | ○ | ⊙ | ○ | ○ | ○ | ⊙ | ○ | ⊙ |
| Water resistance 10) | ⊙ | ⊙ | ⊙ | ⊙ | ⊙ | ⊙ | ⊙ | ⊙ |
| Staining resistance 11) | ⊙ | ⊙ | ○ | ⊙ | ⊙ | ⊙ | ⊙ | ⊙ |
| Water repellency 12) | 94 | 96 | 88 | 89 | 84 | 84 | 81 | 82 |
| Weatherability 13) | ⊙ | ⊙ | ⊙ | ⊙ | ⊙ | ⊙ | ⊙ | ⊙ |
| Storage stability 14) | ⊙ | | ⊙ | | ⊙ | | ⊙ | |

| Coating composition | M-13 | | M-14 | |
|---|---|---|---|---|
| Baking Temp. (°C.) | 100 | 140 | 100 | 140 |
| Gloss | 90 | 89 | | 93 |
| Pencil hardness 3) | F | H | | F |
| DOI gloss 4) | 86 | 89 | | 75 |
| Xylol resistance 5) | ⊙ | ⊙ | | ○ |
| Adhesion 6) | 100/100 | 100/100 | | 100/100 |
| Impact resistance 7) | 30 | 30 | | 20 |
| Acid resistance 8) | ⊙ | ⊙ | | X |
| Scratching resistance 9) | ○ | ○ | | △ |
| Water resistance 10) | ⊙ | ⊙ | | ⊙ |
| Staining resistance 11) | ○ | ○ | | △ |
| Water repellency 12) | 82 | 84 | | 76 |
| Weatherability 13) | ⊙ | ⊙ | | cracking |
| Storage stability 14) | ⊙ | | ⊙ | |

3) Pencil Hardness

Surface of the coat was scratched with a pencil "Mitsubishi Uni" (tradename for pencils manufactured by Mitsubishi Pencil Co., Ltd.) while being pressed with the pencil lead. The degree of pencil hardness was evaluated and expressed in usual symbols for hardness such as H, 2H or B to represent a maximum hardness of lead which caused no mar on the surface.

4) Distinctness-of-Image Gloss (DOI Gloss)

The distinctness-of-image gloss was determined using an image clarity meter (product of Suga Shikenki Kabushiki Kaisha). The figures in tables are ICM values of 0 to 100% as determined by the meter. The larger the value, the higher the distinctness-of-image gloss. The values of more than 80 indicate markedly high distinctness-of-image gloss.

5) Xylol Resistance

Surface of the coat was vigorously rubbed with a piece of xylol-impregnated gauze pressed with fingers to achieve 10 reciprocal strokes. The results were evaluated in terms of the degrees of dissolution, mar and swelling and rated according to the following criteria.
  ⊙: Gloss not affected
  ○: Gloss slightly lost
  △: Gloss lost Δ: Swollen
X: Dissolved

6) Adhesion

The coat was cut crosswise to the surface of the substrate with a razor to form 100 squares, 1 mm×1 mm. An adhesive cellophane tape was adhered to the coating surface and then quickly peeled off. The number (N) of remaining squares was counted and expressed in terms of N/100.

7) Impact Resistance

The impact resistance was determined using a Du Pont impact tester (diameter of impact load element ½ inch; weight 0.5 kg). The degrees of impact resistance were assessed in terms of a maximum height at which the dropping of the weight caused no cracking on the coating surface.

8) Acid Resistance

The coated substrate specimen was immersed in 40% $H_2SO_4$ at 40° C. for 5 hours, withdrawn and washed with water after which the coating surface was observed and evaluated according to the criteria in which the symbols ⊚ to X designate the highest to lowest degrees of acid resistance.
⊚: Gloss not affected
◯: Gloss slightly lost
Δ : Gloss lost
▲: Slight degree of blushing
X: Blushing

9) Scratching Resistance

The scratching resistance was determined using a tester for color fastness of dyed materials against friction (product of Daiei Chemical Precision Machinery Mfg., Co.). A polishing powder ("Daruma Cleanser", trademark) was kneaded with water to give a mass of high viscosity and the resulting mass was placed on the coating surface. While being pressed with a terminal element of the tester, the coating surface was rubbed with the mass deposited thereon under a load of 0.5 kg to achieve 25 reciprocating strokes. After the coated substrate was washed with water, the degree of scratching was evaluated according to the following ratings:
⊚: Not scratched
◯: Slightly scratched
▲ : Scratched in low degree
Δ: Scratched in high degree
X: Scratched in highest degree

10) Water Resistance

The coated substrate specimen was immersed in a thermostatic water bath at 40° C. for 240 hours. After withdrawal, the water resistance of the coating surface was evaluated in scales of 5 grades represented by symbols ⊚ to X in which the symbol ⊚ means the appearance without change as in gloss or blistering.

11) Staining Resistance

A 1 g quantity of stained dust according to JIS No. 15 was placed onto the coated substrate specimen measuring 5×5 cm. The dust was uniformly spread over the substrate with 20 strokes of a brush and was left to stand at 20° C. for 24 hours. The coated substrate specimen was washed in running water with a clean brush and checked for the degree of staining. The results were evaluated according to the following ratings.
⊚: Not stained
◯: Slightly stained
Δ: Stained in unacceptable degree
X: Stained in highest degree

12) Water Repellency

The water repellency was expressed in terms of the angle at which the coating surface is in contact with water. The contact angle was measured with a contact angle meter (product of Kyowa Kagaku Kabushiki Kaisha) 3 minutes after dropping 0.03 ml of distilled water onto the coating surface at a temperature of 20° C. The greater the figure, the higher the water repellency.

13) Weatherability

Using an accelerated weathering tester (manufactured by Q Panel Co., Ltd.), a QUV accelerated exposure test was carried out under the following conditions:
One cycle:

| UV irradiation | 16 hr/60° C. |
|---|---|
| Water condensation | 8 hr/50° C. |

After conducting 125 cycles of operation (3000-hour exposure), the degree of weatherability was evaluated according to the following ratings.
⊚: Retaining substantially the same gloss as in initial stage
◯: Slightly impaired in gloss, but free of flaw such as cracking, blushing and the like
X: Significantly reduced in gloss and defective in respect of cracking and blushing (chalking)

14) Storage Stability

The coating composition diluted to a constant viscosity (22 seconds/Ford Cup No.4) was placed into a container. The container was covered with a lid to prevent exposure to the atmosphere and was stored at 40° C. for 1 week. The storage stability was rated according to the following criteria.
⊚: Increased in viscosity to up to 5 seconds
▲ : Increased in viscosity to 5 to 10 seconds
X: Gelled

We claim:
1. A curable resin composition containing a resin composition comprising a hydroxyl group-containing component (A), and a component (D) containing at least one of a hydrolyzable group directly attached to a silicon atom and a silanol group and also containing epoxy group, at least one of component (A) and component (D) being a fluorine-containing resin, and fluorine-containing resin comprising as a monomer component a fluorine-containing polymerizable unsaturated monomer (c) in an amount of about 1 to about 70% by weight based on the total weight of the components of the composition, wherein said monomer (c) is represented by the formula

$$CX_2=CX_2$$

wherein groups X are the same or different and each represent H, Cl, Br, F, an alkyl group or haloalkyl group with the proviso that at least one fluorine atom is present in the molecule, or represented by the formula

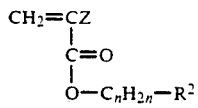

wherein Z is H or CH$_3$, R$^2$ is a fluoroalkyl group and n is an integer of 1 to 10, and further comprising a metal chelate compound.

2. A curable resin composition according to claim 1, wherein the component (A) is a compound which has at least two hydroxyl groups on the average per molecule and which has a number average molecular weight of about 1000 to about 200,000.

3. A curable resin composition according to claim 1, wherein the component (D) is a compound which has at least two epoxy groups and at least one of a hydrolyzable group directly attached to a silicon atom and a silanol group, each on the average per molecule and which has a number average molecular weight of about 1000 to about 200,000.

4. A curable resin composition according to claim 1, which comprises 5 to 95% by weight of the component (A) and 95 to 5% by weight of the component (D).

5. A coating composition comprising the resin composition of any one of claims 1-4 and a pigment.

6. A coating composition comprising the resin composition of any one of claims 1-4 and a compound of up to 2000 in number average molecular weight which contains at least two alicyclic epoxy groups in the molecule.

* * * * *

UNITED STATES PATENT AND TRADEMARK OFFICE
CERTIFICATE OF CORRECTION

PATENT NO. : 5,260,376
DATED : November 9, 1993
INVENTOR(S) : Nakahata et al

It is certified that error appears in the above-indentified patent and that said Letters Patent is hereby corrected as shown below:

Col. 45, line 50,     "and epoxy group-containing compound (B) combined" should be --, epoxy group-containing compound (B) and a component (C) containing hydrolyzable group directly attached to silicon atom and/or silanol group--.

Signed and Sealed this

Twenty-first Day of February, 1995

Attest:

BRUCE LEHMAN

Attesting Officer     *Commissioner of Patents and Trademarks*